United States Patent
Nomura et al.

(10) Patent No.: US 9,783,670 B2
(45) Date of Patent: Oct. 10, 2017

(54) EPOXY RESIN COMPOSITION, PREPREG, AND FIBER-REINFORCED COMPOSITE MATERIAL

(71) Applicant: TORAY INDUSTRIES, INC., Tokyo (JP)

(72) Inventors: Keiichiro Nomura, Nagoya (JP); Nobuhiro Morioka, Nagoya (JP); Sadayuki Kobayashi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/763,065

(22) PCT Filed: Mar. 7, 2014

(86) PCT No.: PCT/JP2014/055952
§ 371 (c)(1),
(2) Date: Jul. 23, 2015

(87) PCT Pub. No.: WO2014/142024
PCT Pub. Date: Sep. 18, 2014

(65) Prior Publication Data
US 2016/0002460 A1    Jan. 7, 2016

(30) Foreign Application Priority Data

Mar. 11, 2013 (JP) ................................. 2013-047727
Aug. 30, 2013 (JP) ................................. 2013-179073

(51) Int. Cl.
| | | |
|---|---|---|
| B32B 27/04 | (2006.01) | |
| B32B 27/18 | (2006.01) | |
| B32B 27/26 | (2006.01) | |
| B32B 27/38 | (2006.01) | |
| C08L 63/00 | (2006.01) | |
| C08L 33/04 | (2006.01) | |
| C08L 33/14 | (2006.01) | |
| C08L 53/00 | (2006.01) | |
| C08J 5/24 | (2006.01) | |

(52) U.S. Cl.
CPC ................ C08L 53/00 (2013.01); C08J 5/24 (2013.01); C08L 63/00 (2013.01); *C08J 2333/08* (2013.01); *C08J 2333/10* (2013.01); *C08J 2363/00* (2013.01); *C08L 2201/02* (2013.01); *C08L 2205/16* (2013.01)

(58) Field of Classification Search
None
See application file for complete search history.

(56) References Cited

U.S. PATENT DOCUMENTS

| | | | |
|---|---|---|---|
| 6,319,967 B1* | 11/2001 | Coca ........................ | C08F 8/26 523/436 |
| 2004/0034124 A1 | 2/2004 | Court et al. | |
| 2010/0209642 A1 | 8/2010 | Tomioka et al. | |
| 2010/0273905 A1* | 10/2010 | Muenz ..................... | C08L 63/00 521/135 |
| 2011/0003947 A1 | 1/2011 | Kishi et al. | |
| 2011/0009528 A1 | 1/2011 | Tomioka et al. | |
| 2011/0061891 A1* | 3/2011 | Schadler ................ | B82Y 30/00 174/110 SR |
| 2011/0184091 A1 | 7/2011 | Mizuki et al. | |
| 2013/0202873 A1* | 8/2013 | Mizuki ................... | C08G 59/38 428/299.1 |
| 2013/0217805 A1 | 8/2013 | Hayashi et al. | |

FOREIGN PATENT DOCUMENTS

| | | |
|---|---|---|
| CA | 2825080 A1 | 8/2012 |
| EP | 2036950 A1 | 3/2009 |
| JP | 2003-535181 A | 11/2003 |
| JP | 2008-7682 A | 1/2008 |
| JP | 2012-188651 A | 11/2008 |
| JP | 2009-79119 A | 4/2009 |
| JP | 2010-100834 A | 5/2010 |
| WO | WO 2006/052729 A | 5/2006 |
| WO | WO 2006/077153 A2 | 7/2006 |
| WO | WO 2008/143044 A1 | 11/2008 |
| WO | WO 2009/101961 A1 | 8/2009 |
| WO | WO 2009/107697 A1 | 9/2009 |
| WO | WO 2012/043453 A1 | 4/2012 |

OTHER PUBLICATIONS

International Search Report, issued in PCT/JP2014/055952, dated Apr. 28, 2014.
Written Opinion of the International Searching Authority, issued in PCT/JP2014/055952, dated Apr. 28, 2014.
Extended European Search Report, dated Jan. 20, 2017, for European Application No. 14763086.7.

* cited by examiner

*Primary Examiner* — Michael J Feely
(74) *Attorney, Agent, or Firm* — Birch, Stewart, Kolasch & Birch, LLP

(57) ABSTRACT

An epoxy resin composition according to the present invention comprises an epoxy compound (A), a block copolymer (B) and a curing agent (C), wherein the block copolymer (B) is composed of a polymer block (a) comprising a (meth) acrylic polymer and a polymer block (b) comprising an acrylic polymer that is different from the polymer block (a), said epoxy resin composition having such a property that a cured resin product produced by curing the epoxy resin composition forms a microphase-separated structure. A cured product of the epoxy resin composition forms a highly ordered phase structure, and therefore has excellent toughness and stiffness.

12 Claims, No Drawings

EPOXY RESIN COMPOSITION, PREPREG, AND FIBER-REINFORCED COMPOSITE MATERIAL

TECHNICAL FIELD

The present invention relates to an epoxy resin composition that can form cured epoxy resin having high toughness and rigidity and also relates to prepreg and fiber reinforced composite material produced therefrom.

BACKGROUND ART

High in specific strength and specific modulus, fiber reinforced composite materials containing carbon fiber, aramid fiber, etc., as reinforcing fiber have been used widely for manufacturing structural materials for aircraft and automobiles, sporting goods such as tennis rackets, golf shafts, and fishing rods, as well as general industrial applications. A common method widely used for producing these fiber reinforced composite materials is to prepare sheet-like intermediate material called prepreg by impregnating reinforcing fiber with matrix resin and cure a stack of a plurality of such sheets. The use of prepreg have the advantage of producing high performance fiber reinforced composite material easily because the orientation of the reinforcing fiber can be controlled accurately and a high degree of design freedom is ensured for the stack structure. As the matrix resin of such prepreg, thermosetting resin compositions are mainly used from the viewpoint of heat resistance and productivity and in particular, epoxy resin compositions are preferred from the viewpoint of mechanical characteristics such as adhesion to reinforcing fiber.

Fiber reinforced composite materials containing epoxy resin as matrix resin have high heat resistance and good machine physical properties, but epoxy resin is generally lower in elongation percentage and toughness than thermoplastic resin, possibly leading to low impact resistance. Thus, improvements have been called for.

Some attempts, such as adding a tough rubber component or thermoplastic resin, have been made with the aim of producing tougher epoxy resin by curing an epoxy resin composition. However, rubber is significantly lower in elastic modulus and glass transition temperature than cured epoxy resin and therefore, the addition of a rubber component will cause a decrease in elastic modulus and glass transition temperature of matrix resin, making it difficult to maintain a good balance between toughness and rigidity. The proposed methods for blending a thermoplastic component include, for example, adding a copolymer composed of styrene, butadiene, and methyl methacrylate or a block copolymer composed of butadiene and methyl methacrylate in order to provide cured epoxy resin having largely improved toughness (Patent documents 1 and 2). However, these methods have problems such as a decreased heat resistance of cured epoxy resin, deterioration in processability due to increased viscosity of the epoxy resin composition, and deterioration in quality due to generation of voids. Furthermore, Patent document 3 proposes the technique of blending a (meth)acrylic block copolymer with the epoxy resin to produce an alloy. This technique can ensure high toughness, which results from forming a fine phase structure without making the phase separation structure coarse, but further improvements for ensuring higher toughness have been called for.

A disclosed method for providing cured epoxy resin having an improved balance between toughness and rigidity is the use of an epoxy resin composition produced by combining a diglycidyl ether type epoxy compound having a specific number average molecular weight and an epoxy compound that differs from the above epoxy compound in solubility parameter (SP value) in a specific range (Patent document 4). Even with this method, however, the resulting cured epoxy resin will fail to have a sufficiently good balance between toughness and rigidity and furthermore, the epoxy resin composition will be likely to have increased viscosity.

A method available to provide cured epoxy resin with a further improved balance between toughness and rigidity is to use an epoxy resin composition in combination with an epoxy compound with a specific SP value so that a phase separation structure will be formed after curing reaction (Patent document 5). This method can produce cured epoxy resin with high toughness and rigidity by forming a fine phase separation structure after curing and serves to largely improve the performance of matrix resin in conventional fiber reinforced composite materials. However, depending on the reaction conditions, the problem of deterioration in physical properties can occur as a result of a change in the phase separation structure.

PRIOR ART DOCUMENTS

Patent Documents

Patent document 1: International Publication WO 2006/077153
Patent document 2: Published Japanese Translation of PCT International Publication JP 2003-535181
Patent document 3: Japanese Unexamined Patent Publication (Kokai) No. 2010-100834
Patent document 4: International Publication WO 2009/107697
Patent document 5: International Publication WO 2010/043453

SUMMARY OF THE INVENTION

Problems to be Solved by the Invention

An object of the present invention is to provide an epoxy resin composition that serves to produce cured epoxy resin and fiber reinforced composite material that have high toughness and rigidity.

Means of Solving the Problems

To solve the problems, the present invention has the following constitution:

(1) An epoxy resin composition including an epoxy compound (A), a block copolymer (B), and a curing agent (C), wherein the block copolymer (B) is composed of a polymer block (a) containing a (meth)acrylic polymer and another polymer block (b) containing an acrylic polymer different from that of the polymer block (a), and the epoxy resin composition being curable to form cured resin having a microphase-separated structure.

(2) The epoxy resin composition according to (1), that meets the relation 0<X/Y≤1.10 where X represents the half-width of the primary scattering peak in small-angle X-ray scattering observation of the cured resin and Y represents the maximum wave number of the peak.

(3) The epoxy resin composition according to (1) or (2), wherein the microphase-separated structure in the cured resin is one selected from the group consisting of lamella structure, gyroid structure, cylinder structure, and sphere structure.

(4) The epoxy resin composition according to any one of (1) to (3), wherein the block copolymer (B) is an ABA type triblock copolymer where A represents the polymer block (a) and B represents the polymer block (b).

(5) The epoxy resin composition according to any one of (1) to (4), wherein the block copolymer (B) has a weight average molecular weight of 10,000 or more and 400,000 or less and a molecular weight distribution of 1.50 or less.

(6) The epoxy resin composition according to any one of (1) to (5), wherein glycidyl (meth)acrylate accounts for 50 mass % or more of the polymer block (a) in the block copolymer (B).

(7) The epoxy resin composition according to any one of (1) to (6), wherein n-butyl acrylate accounts for 50 mass % or more of the polymer block (b) in the block copolymer (B).

(8) The epoxy resin composition according to any one of (1) to (7), wherein the block copolymer (B) accounts for 10 mass % or more of the epoxy resin composition.

(9) The epoxy resin composition according to any one of (1) to (8), wherein the polymer block (a) accounts for 5 mass % or more and 80 mass % or less of the block copolymer (B).

(10) The epoxy resin composition according to (9), wherein the curing agent (C) is a polyamine based curing agent and the polymer block (a) accounts for 40 mass % or more and 70 mass % or less of the block copolymer (B).

(11) The epoxy resin composition according to (9), wherein the curing agent (C) is a dicyandiamide based curing agent and the polymer block (a) accounts for 5 mass % or more and 40 mass % or less of the block copolymer (B).

(12) The epoxy resin composition according to (9), wherein the curing agent (C) is an anionic or cationic polymerization based curing agent and the polymer block (a) accounts for 5 mass % or more and 30 mass % or less of the block copolymer (B).

(13) Prepreg including an epoxy resin composition as described in any one of (1) to (12) and reinforcing fiber.

(14) Fiber reinforced composite material produced by curing prepreg as described in (13).

(15) Fiber reinforced composite material including cured resin produced by curing an epoxy resin composition as described in any one of (1) to (12) and reinforcing fiber.

Advantageous Effect of the Invention

When the epoxy resin composition according to the present invention is cured, it forms cured epoxy resin that has a highly ordered microphase-separated structure formed therein, making it possible to provide cured epoxy resin and fiber reinforced composite material that have a fine regular phase-separated structure as well as high toughness and rigidity.

DESCRIPTION OF PREFERRED EMBODIMENTS

The invention is described in more detail below. The epoxy resin composition according to the present invention includes an epoxy compound (A), a block copolymer (B), and a curing agent (C) as essential components and when cured, forms cured resin having a microphase-separated structure.

The epoxy compound (A) is necessary to develop heat resistance and mechanical characteristics. Specifically, it is preferably an epoxy resin produced from a phenol, amine, carboxylic acid, or intramolecular unsaturated carbon as precursor.

Glycidyl ether type epoxy resins that can be produced from a phenol as precursor include bisphenol A type epoxy resin, bisphenol F type epoxy resin, bisphenol S type epoxy resin, epoxy resin having a biphenyl backbone, phenol novolac type epoxy resin, cresol novolac type epoxy resin, resorcinol type epoxy resin, epoxy resin having a naphthalene backbone, tris-phenyl methane type epoxy resin, phenol aralkyl type epoxy resin, dicyclopentadiene type epoxy resin, diphenyl fluorene type epoxy resin, isomers thereof, alkyl substitution products thereof, and halogen substitution products thereof. An epoxy resin that is produced by modifying an epoxy resin produced from phenol as precursor with urethane or isocyanate is also included in this category.

Commercially available products of bisphenol A type epoxy resin include Epikote (registered trademark) (hereinafter the indication of "registered trademark" is omitted) 825, Epikote 826, Epikote 827, Epikote 828, Epikote 834, Epikote 1001, Epikote 1002, Epikote 1003, Epikote 1004, Epikote 1004AF, Epikote 1007, Epikote 1009 (all manufactured by Japan Epoxy Resins Co., Ltd.), Epicron (registered trademark) (hereinafter the indication of "registered trademark" is omitted) 850 (manufactured by DIC Corporation), Epotohto (registered trademark) (hereinafter the indication of "registered trademark" is omitted) YD-128 (manufactured by Tohto Kasei Co., Ltd.), DER-331, and DER-332 (manufactured by The Dow Chemical Company).

Commercially available products of bisphenol F type epoxy resin include Epikote 806, Epikote 807, Epikote 1750, Epikote 4004P, Epikote 4007P, Epikote 4009P (all manufactured by Japan Epoxy Resins Co., Ltd.), Epicron 830 (manufactured by DIC Corporation), Epotohto YD-170, Epotohto YD-175, Epotohto YDF2001, and Epotohto YDF2004 (all manufactured by Tohto Kasei Co., Ltd.). Commercially available products of tetramethyl bisphenol F type epoxy resin, which is an alkyl substitution product, include YSLV-80XY (manufactured by Nippon Steel Chemical Co., Ltd.)

Commercially available products of bisphenol S type epoxy resin include Epicron EXA-1515 (manufactured by DIC Corporation).

Commercially available products of epoxy resin with a biphenyl backbone include Epikote YX4000H, Epikote YX4000, Epikote YL6616, Epikote YL6121H, Epikote YL6640 (all manufactured by Japan Epoxy Resins Co., Ltd.), and NC-3000 (manufactured by Nippon Kayaku Co., Ltd.).

Commercially available products of phenol novolac type epoxy resin include Epikote 152, Epikote 154 (both manufactured by Japan Epoxy Resins Co., Ltd.), Epicron N-740, Epicron N-770, and Epicron N-775 (all manufactured by DIC Corporation).

Commercially available products of cresol novolac-type epoxy resin include Epicron N-660, Epicron N-665, Epicron N-670, Epicron N-673, and Epicron N-695 (all manufactured by DIC), and EOCN-1020, EOCN-102S, and EOCN-104S (all manufactured by Nippon Kayaku Co., Ltd.).

Commercially available products of resorcinol type epoxy resin include Denacol (registered trademark) (hereinafter the indication of "registered trademark" is omitted) and EX-201 (manufactured by Nagase ChemteX Corporation).

Commercially available products of epoxy resin having a naphthalene backbone include Epicron HP4032 (manufactured by DIC Corporation), NC-7000, and NC-7300 (both manufactured by Nippon Kayaku Co., Ltd.).

Commercially available products of tris-phenyl methane type epoxy resin include TMH-574 (manufactured by Sumitomo Chemical Co., Ltd.) and Tactix742 (manufactured by Huntsman Advanced Materials Gmbh).

Commercially available products of dicyclopentadiene type epoxy resin include Epicron HP7200, Epicron HP7200L, Epicron HP7200H (all manufactured by DIC Corporation), Tactix558 (manufactured by Huntsman Advanced Materials Gmbh), XD-1000-1L, and XD-1000-2L (both manufactured by Nippon Kayaku Co., Ltd.).

Commercially available products of urethane- or isocyanate-modified epoxy resin include AER4152 (manufactured by Asahi Kasei Epoxy Co., Ltd.) and ACR1348 (manufactured by Asahi Denka Co. Ltd.), which have an oxazolidone ring.

Commercially available products of bisphenol A type epoxy resin modified with dimer acid include Epikote 872 (manufactured by Japan Epoxy Resins Co., Ltd.).

Glycidyl amine type epoxy resins that can be produced from an amine as precursor include tetraglycidyl diaminodiphenyl methane, glycidyl compounds of xylene diamine, triglycidyl aminophenol, glycidyl aniline, position isomers thereof, alkyl substitution products thereof, and halogen substitution products thereof. In particular, tetraglycidyl diaminodiphenyl methane is preferred because of being high in heat resistance and able to serve as resin for producing composite material for aircraft structural members. On the other hand, glycidyl anilines are preferred because high elastic modulus can be ensured.

Commercially available products of tetraglycidyl diaminodiphenyl methane include Sumiepoxy ELM434 (manufactured by Sumitomo Chemical Co., Ltd.), Araldite (registered trademark) (hereinafter the indication of "registered trademark" is omitted) MY720, Araldite MY721, Araldite MY9512, Araldite MY9612, Araldite MY9634, Araldite MY9663 (all manufactured by Huntsman Advanced Materials Gmbh), and Epikote 604 (manufactured by Japan Epoxy Resins Co., Ltd.).

Commercially available products of glycidyl compounds of xylene diamine include TETRAD-X (Mitsubishi Gas Chemical Company, Inc.).

Commercially available products of triglycidyl aminophenol include Epikote 630 (manufactured by Japan Epoxy Resins Co., Ltd.), Araldite MY0500, MY0510, MY0600 (all manufactured by Huntsman Advanced Materials Gmbh), and ELM100 (manufactured by Sumitomo Chemical Co., Ltd.).

Commercially available products of glycidyl aniline include GAN and GOT (both manufactured by Nippon Kayaku Co., Ltd.).

Epoxy resins that can be produced from carboxylic acid as precursor include glycidyl compounds of phthalic acid, glycidyl compounds of hexahydrophthalic acid, glycidyl compounds of dimer acid, and isomers thereof.

Commercially available products of phthalic acid diglycidyl ester include EPOMIK (registered trademark) (hereinafter the indication of "registered trademark" is omitted) R508 (manufactured by Mitsui Chemicals, Inc.) and Denacol EX-721 (manufactured by Nagase ChemteX Corporation).

Commercially available products of hexahydrophthalic acid diglycidyl ester include EPOMIK R540 (manufactured by Mitsui Chemicals, Inc.) and AK-601 (manufactured by Nippon Kayaku Co., Ltd.).

Commercially available products of dimer acid diglycidyl ester include Epikote 871 (manufactured by Japan Epoxy Resins Co., Ltd.) and Epotohto YD-171 (manufactured by Tohto Kasei Co., Ltd.).

Epoxy resins that can be produced from intramolecular unsaturated carbon as precursor include, for example, alicyclic epoxy resin. Commercially available products thereof include Celloxide (registered trademark) (hereinafter the indication of "registered trademark" is omitted) 2021, Celloxide 2080 (both manufactured by Daicel Chemical Industries, Ltd.), and CY183 (manufactured by Huntsman Advanced Materials Gmbh).

Furthermore, the epoxy resin composition according to the present invention may contain an epoxy compound other than the epoxy compound (A) unless it impairs the advantageous effects of the invention, with the aim of adjusting the viscoelasticity of the composition to improve the workability and providing cured resin with improved elastic modulus and heat resistance. Such compounds may be used singly or as a combination of a plurality thereof.

There are no specific limitations on the curing agent (C) as long as it can cure the epoxy compound and useful materials include polyamine based curing agents, dicyandiamide based curing agents, anionic or cationic polymerization based curing agents, and anhydride based curing agents. This curing agent component is necessary to cure the epoxy resin composition.

A polyamine based curing agent is a curing agent substance that has a plurality of primary amino groups in one molecule, and an epoxy resin composition is cured as the active hydrogen atoms in the primary amino groups undergo addition reaction with the epoxy group in the epoxy compound. Specifically, such substances include aromatic amine based curing agents such as 4,4'-diaminodiphenyl methane, 4,4'-diaminodiphenyl sulfone, 3,3'-diaminodiphenyl sulfone, m-phenylene diamine, m-xylylene diamine, and diethyl toluene diamine and aliphatic amine based curing agents such as diethylene triamine, triethylene tetramine, isophorone diamine, bis(aminomethyl) norbornane, bis(4-aminocyclohexyl) methane, and dimer acid ester of polyethylene imine. This category further includes modified amine based curing agents produced by reacting an amine based curing agent having an active hydrogen, such as aromatic amine based curing agents and aliphatic amine based curing agents, with a compound such as an epoxy compound, acrylonitrile, phenol, formaldehyde, and thiourea. Commercially available products of aromatic polyamine curing agents include Seikacure S (manufactured by Wakayama Seika Kogyo Co., Ltd.), MDA-220 (manufactured by Mitsui Chemicals, Inc.), jER Cure (registered trademark) W (manufactured by Mitsubishi Chemical Corporation), 3,3'-DAS (manufactured by Mitsui Chemicals, Inc.), Lonzacure (registered trademark) M-DEA (manufactured by Lonza), Lonzacure (registered trademark) M-DIPA (manufactured by Lonza), Lonzacure (registered trademark) M-MIPA (manufactured by Lonza), and Lonzacure (registered trademark) DETDA 80 (manufactured by Lonza).

When a polyamine based curing agent is used as the component (C), its blending quantity is preferably 0.5 to 1.5 equivalents, preferably 0.8 to 1.2 equivalents, relative to the epoxy compound (A) in the epoxy resin composition, from the viewpoint of heat resistance and mechanical characteristics. The curing reaction may not proceed if it is less than 0.5 equivalent. If it is more than 1.5 equivalents, the cured resin resulting from the curing of the epoxy resin composition may fail to have a microphase-separated structure, possibly leading to deteriorated mechanical characteristics.

Adding a powdery polyamine based curing agent to the resin is preferred from the viewpoint of storage stability at room temperature.

When a dicyandiamide based curing agent is used, the curing of an epoxy resin composition occurs as a result of not only the addition reaction of the four active hydrogens with the epoxy group in the epoxy compound, but also the reaction of the cyano group with the secondary hydroxyl group in the ring-opened epoxy group and the oxazoline ring-forming reaction between the cyano group and the epoxy group. The above mentioned dicyandiamide based curing agents include not only dicyandiamides, but also dicyandiamide derivatives produced by connecting an epoxy resin, vinyl compound, acrylic compound, or other various compounds with a dicyandiamide.

Commercially available products of dicyandiamide include DICY-7 and DICY-15 (both manufactured by Japan Epoxy Resins Co., Ltd.).

When a dicyandiamide or a derivative thereof is used as the curing agent (C), its blending quantity is preferably 0.3 to 1.5 equivalents, preferably 0.5 to 1.0 equivalents, relative to the epoxy compound (A) in the epoxy resin composition, from the viewpoint of heat resistance and mechanical characteristics. The curing reaction may not proceed if it is less than 0.3 equivalent. If it is more than 1.5 equivalents, the cured resin resulting from the curing of the epoxy resin composition may fail to have a microphase-separated structure, possibly leading to deteriorated mechanical characteristics. Adding a powdery dicyandiamide or derivative thereof to the resin is preferred from the viewpoint of storage stability at room temperature.

When dicyandiamide is used as the curing agent (C), the dicyandiamide may be used alone or in combination with a curing catalyst for dicyandiamide or another curing agent for epoxy resin. Such curing catalysts for dicyandiamide include urea based, imidazole based, and Lewis acid based catalysts. Such curing agents for epoxy resin include aromatic amine curing agents, alicyclic amine curing agents, and anhydride curing agents. Commercially available products of urea based ones include DCMU 99 (manufactured by Hodogaya Chemical Co., Ltd.), Omicure 24, Omicure 52, and Omicure 94 (all manufactured by CVC Specialty Chemicals, Inc.). Commercially available products of imidazole based ones include 2MZ, 2PZ, and 2E4MZ (all manufactured by Shikoku Chemicals Corporation). Such Lewis acid catalysts include complexes of halogenated boron and a salt group, such as boron trifluoride/piperidine complexes, boron trifluoride/monoethyl amine complexes, boron trifluoride/triethanol amine complexes, and boron trichloride/octyl amine complexes. When a curing catalyst is used, its blending quantity is preferably 0.5 to 5.0 parts by mass, more preferably 1.0 to 3.0 parts by mass, relative to 100 parts by mass of the epoxy compound (A) in the epoxy resin composition, from the viewpoint of heat resistance and mechanical characteristics.

When an anionic or cationic polymerization based curing agent is used, the curing agent acts as a catalyst for anionic polymerization or cation polymerization to cause self-polymerization of the epoxy group in the epoxy compound, thus working to cure the epoxy resin composition. Specifically, such anionic polymerization based curing agents include imidazole and derivatives thereof such as 2-methyl imidazole, 1-benzyl-2-methyl imidazole, 2-ethyl-4-methyl imidazole; carboxylic acid hydrazide derivatives such as adipic acid hydrazide and naphthalene carboxylic acid hydrazide; and tertiary amines such as N,N-dimethyl aniline, N,N-dimethyl benzyl amine, and 2,4,6-tris-(dimethyl aminomethyl) phenol. Such cationic polymerization based curing agents include onium salt based curing agents such sulfonium salts, ammonium salts, and pyridinium salts; and aluminum complex composite based curing agents.

Among other anionic or cationic polymerization based curing agents, imidazole or derivatives thereof are preferred from the viewpoint of curing speed. When imidazole or a derivative thereof is used, its blending quantity is preferably 0.5 to 10 parts by mass relative to 100 parts by mass of the epoxy compound (A) in the epoxy resin composition, from the viewpoint of heat resistance and mechanical characteristics. If it is less than 0.5 parts by mass, the curing speed may decrease and the cure reaction may not proceed sufficiently, possibly having adverse influence on the mechanical characteristics. If it is more than 10 parts by mass, on the other hand, the curing speed will increase, but the cross-linking density may become too high, possibly leading to a decrease in toughness.

An anhydride based curing agent has one or more carboxylic anhydride groups in one molecule and condensation polymerization reaction occurs between the epoxy group in an epoxy compound and the carboxylic anhydride group to cause the curing of the epoxy resin composition. Specifically, examples include acid anhydrides that have an aromatic ring, but do not have an alicyclic structure, such as phthalic anhydride; anhydrides that have no aromatic ring or alicyclic structure, such as succinic anhydride; and anhydrides that have an alicyclic structure such as hexahydrophthalic anhydride, methylhexahydrophthalic anhydride, methyldihydronadic anhydride, 1,2,4,5-cyclopentane tetracarboxylic dianhydride, 1,2,3,6-tetrahydrophthalic anhydride, methyl-1,2,3,6-tetrahydrophthalic anhydride, nadic anhydride, methylnadic anhydride, bicyclo[2,2,2]oct-7-ene-2,3,5,6-tetracarboxylic dianhydride, and 4-(2,5-dioxotetrahydrofuran-3-yl)-3-methyl-1,2,5,6-tetrahydrophthalic anhydride.

When an anhydride based curing agent is used as the component (C), its blending quantity is preferably 0.5 to 1.5 equivalents, preferably 0.8 to 1.2 equivalents, relative to the epoxy compound (A) in the epoxy resin composition, from the viewpoint of heat resistance and mechanical characteristics. The curing reaction may not proceed if it is less than 0.5 equivalent. If it is more than 1.5 equivalents, the cured resin resulting from the curing of the epoxy resin composition may fail to have a microphase-separated structure, possibly leading to deteriorated mechanical characteristics.

For the curing of the epoxy resin composition according to the present invention, there are no specific limitations on the curing temperature and curing period, which may be adjusted appropriately depending on the curing agent and catalyst added. For example, curing is performed preferably at a temperature of 180° C. for 2 hours when diaminodiphenyl sulfone is used as curing agent or catalyst, at a temperature of 150° C. for 2 hours when diaminodiphenyl methane is used, at a temperature of 150° C. for 1 hour when 2-ethyl-4-methyl imidazole is used, and at a temperature of 135° C. for 2 hours when dicyandiamide and DCMU are used.

The block copolymer (B) used for the present invention includes a (meth)acrylic polymer block (a) (hereinafter, "methacrylic" and "acrylic" are collectively referred to as "(meth)acrylic") and a (meth)acrylic polymer block (b) different from the polymer block (a).

The polymer block (a) is produced by polymerizing monomers selected from the group of acrylates and methacrylates and becomes compatible with the epoxy compound (A) after the epoxy resin composition is cured.

Accordingly, the monomers having a glycidyl group preferably account for 50 mass % or more, more preferably 70 mass % or more, and still more preferably 90% or more, in the polymer block (a). If monomers having a glycidyl group are contained in the polymer block (a), the glycidyl group, along with the glycidyl group in the epoxy compound (A), reacts with the curing agent (C) as the epoxy resin composition is cured so that the epoxy compound (A) and the polymer block (a) become highly compatible with each other, facilitating the formation of a microphase-separated structure. As a result, the resulting cured resin will be likely to have intended mechanical characteristics. If the monomers having a glycidyl group account for only less than 50 mass % in the polymer block (a), the compatibility between the epoxy compound (A) and the block copolymer (B) will decrease and the cured resin produced by curing the epoxy resin composition may fail to form a microphase-separated structure and accordingly may fail to have required dynamic physical properties.

Such monomers having a glycidyl group include, for example, esters formed from (meth)acrylic acid and an alcohol containing an organic group and an epoxy ring, such as glycidyl (meth)acrylate, 2,3-epoxy-2-methylpropyl (meth)acrylate, and (3,4-epoxy cyclohexyl) methyl (meth) acrylate; and unsaturated compounds containing an epoxy group, such as 4-vinyl-1-cyclohexene-1,2-epoxide. In particular, glycidyl (meth)acrylate is preferred from the viewpoint of availability.

In addition to monomers having a glycidyl group such as glycidyl methacrylate and glycidyl acrylate, the polymer block (a) may also contain methacrylic acid alkyl esters such as methyl methacrylate, ethyl methacrylate, n-propyl methacrylate, n-butyl methacrylate, isobutyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, and stearyl methacrylate. It is preferable for these alkyl esters to contain 1 to 18 carbon atoms. They may be used singly or a plurality thereof may be used in combination.

The polymer block (b), which is different from the polymer block (a) and produced by polymerizing acrylic monomers, undergoes phase separation from the epoxy compound (A) after the epoxy resin composition is cured. Accordingly, the monomers having a glycidyl group preferably account for less than 50 mass % in the polymer block (b) and more preferably such monomers having a glycidyl group are not contained.

Useful monomers to be contained in the polymer block (b) include (meth)acrylic acid alkyl esters, such as methyl (meth)acrylate, ethyl (meth)acrylate, n-propyl (meth)acrylate, n-butyl (meth)acrylate, isobutyl (meth)acrylate, n-pentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate. It is preferable for these alkyl esters to contain 1 to 18 carbon atoms. They may be used singly or a plurality thereof may be used in combination.

It is preferable for the polymer block (b) to be composed of monomers that can form a flexible polymer block, so that the cured product of the epoxy resin composition will have improved mechanical characteristics, particularly high impact resistance and toughness. Useful flexible polymer blocks include methyl acrylate, ethyl acrylate, n-propyl acrylate, n-butyl acrylate, isobutyl acrylate, n-pentyl (meth) acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate. In particular, n-butyl acrylate preferably accounts for 50 mass % or more, more preferably 70 mass % or more, and still more preferably 90 mass % or more, in the polymer block (b). If n-butyl acrylate accounts for only less than 50 mass % in the polymer block (b), the flexibility of the n-butyl acrylate will not be fully exhibited, possibly resulting in cured resin with decreased impact resistance, toughness, etc.

Depending on the type of curing agent used, the polymer block (a), which constitutes part of the block copolymer (B), preferably accounts for 5 mass % or more and 80 mass % or less in the block copolymer (B). If the polymer block (a) accounts for only less than 5 mass %, its compatibility with the epoxy compound (A) will decrease, possibly leading to the formation of a coarse phase-separated structure after curing. A decrease in toughness may occur if the polymer block (a) accounts for more than 80 mass %.

In particular, if a polyamine based curing agent is used as the curing agent (C), the polymer block (a) more preferably accounts for 40 mass % or more and 70 mass % or less, still more preferably 40 mass % or more and 60 mass % or less, in the block copolymer (B). If the polymer block (a) accounts for only less than 40 mass %, its compatibility with the epoxy compound will decrease, possibly leading to the formation of a coarse phase-separated structure in the cured resin. Cured resin with good mechanical characteristics can be obtained if the polymer block (a) accounts for 70 mass % or less.

If a dicyandiamide based curing agent is used as the curing agent (C), the polymer block (a) preferably accounts for 5 mass % or more and 40 mass % or less, more preferably 10 mass % or more and 30 mass % or less, in the block copolymer (B). If the polymer block (a) accounts for only less than 5 mass %, its compatibility with the epoxy compound will decrease, possibly leading to the formation of a coarse phase-separated structure in the cured resin. Cured resin with good mechanical characteristics can be obtained if the polymer block (a) accounts for 40 mass % or less.

If an anionic or cationic polymerization based curing agent is used as the curing agent (C), the polymer block (a) preferably accounts for 5 mass % or more and 30 mass % or less, more preferably 10 mass % or more and 20 mass % or less, in the block copolymer (B). If the polymer block (a) accounts for only less than 5 mass %, its compatibility with the epoxy compound will decrease, possibly leading to the formation of a coarse phase-separated structure in the cured resin. Cured resin with good mechanical characteristics can be obtained if the polymer block (a) accounts for 30 mass % or less.

Here, the content of the polymer block (a) in the block copolymer (B) can be determined by $^1$H-NMR analysis using deuterated chloroform as solvent.

In regard to the molecular form, the block copolymer (B) may be a linear block copolymer, a branched block copolymer, or a mixture thereof, of which a linear block copolymer is preferred from the viewpoint of cost and easiness of polymerization. There are no specific limitations on the structure of such a linear block copolymer, but it is particularly preferably a triblock copolymer from the viewpoint of the properties of the linear block copolymer and the properties of the composition. Furthermore, it is preferably a triblock copolymer represented as ABA where A and B denote a polymer block (a) and a polymer block (b), respectively, from the viewpoint of easiness of handling during processing and properties of the composition.

It is more preferable for the block copolymer (B) to have a weight average molecular weight of at least 10,000 or more, more preferably at least 40,000 or more. If its weight average molecular weight is less than 10,000, the mechanical characteristics of the polymer block (b) will not be exhibited sufficiently, possibly leading to a decrease in toughness. It is more preferable for the block copolymer (B) to have a weight average molecular weight of 400,000 or less, more preferably 200,000 or less, still more preferably 100,000 or less. If the weight average molecular weight is more than 400,000, the block copolymer itself may be low in handleability or may lead to an epoxy resin composition with an increased viscosity, possibly causing troubles during the molding process.

It is preferable for the block copolymer (B) to have a molecular weight distribution (Mw/Mn), which is the ratio between the weight average molecular weight (Mw) and the number average molecular weight (Mn), to be 1.50 or less, more preferably 1.20 or less. If the molecular weight distribution is large, representing uneven lengths of the molecular chains, the molecules may be low in uniformity and the cured product of the epoxy resin composition may fail to form a microphase-separated structure, possibly leading to deterioration in mechanical characteristics. Here, the weight average molecular weight and molecular weight distribution can be determined by gel permeation chromatography (GPC). Specifically, the retention time is measured for a polymethyl methacrylate calibration sample and converted into a molecular weight.

In the epoxy resin composition according to the present invention, the block copolymer (B) preferably accounts for 10 mass % or more. If the content is less than 10 mass %, the content of the polymer block (b) will be too small to form the (II) phase in the microphase-separated structure, possibly failing to form a microphase-separated structure. It is more preferable for the block copolymer (B) to account for 50 mass % or less, more preferably 40 mass % or less, and still more preferably 30 wt % or less, in an epoxy resin composition. If the content is more than 50 mass %, the resulting epoxy resin composition will be too high in viscosity, leading to problems, such as poor handleability, during the molding process.

The epoxy resin composition according to the present invention has the feature of forming cured resin containing a microphase-separated structure after curing. Here, a microphase-separated structure is a phase-separated structure formed through microphase separation. Microphase separation is a phase separation process in which a block copolymer composed of two or more inherently incompatible polymers bonded by covalent bonding spontaneously forms periodic interfaces, each about the size of a molecular chain, so as to minimize the interfacial area, and undergoes molecular-level phase separation between phase (I) and phase (II). Phase (I) and phase (II) are composed of components that constitute the block copolymer, but other components that are compatible with phase (I) or phase (II) may also be contained. The microphase-separated structure has the feature of being highly ordered to serve for producing cured epoxy resin and fiber reinforced composite material having toughness and rigidity in a good balance.

The epoxy resin composition according to the present invention includes an epoxy compound (A), a block copolymer (B), and a curing agent (C) that are preferably compatible with each other before curing reaction and undergo microphase separation into phase (I) and phase (II) after curing reaction. After curing, phase (I) preferably consists mainly of the cured product of the epoxy compound (A) and the polymer block (a), which is a component of the block copolymer (B), in a mutually compatible state while phase (II) preferably consists mainly of the polymer block (b) which is a component of the block copolymer (B).

The ordered state of the microphase-separated structure can be examined by scattering methods such as small angle X-ray scattering and neutron scattering. In an angular distribution profile of scattering strength attributable to a phase structure measured by a scattering method, a narrower peak shows a higher degree of order.

The microphase-separated structure in a cured product produced by curing the epoxy resin composition according to the present invention can be examined by analyzing the angular distribution profile of the scattering strength of small angle X-ray scattering. In small angle X-ray scattering observation, the primary scattering peak attributable to the microphase-separated structure preferably meets the relation $0 < X/Y \leq 1.10$, more preferably $0 < X/Y \leq 1.05$, where X and Y denote the half-width and maximum wave number of the peak, respectively. Cured epoxy resin with better mechanical characteristics can be obtained as the value of X/Y reaches zero, but sufficiently good mechanical characteristics can be ensured when $0.80 \leq X/Y \leq 1.10$, or even when $1.00 \leq X/Y \leq 1.10$. If $1.1 < X/Y$, the peak will be too broad, showing the absence of a microphase-separated structure, and it will be impossible to obtain cured epoxy resin with good mechanical characteristics.

In small angle X-ray scattering observation of a cured product of the epoxy resin composition according to the present invention, furthermore, it is preferable that secondary or higher-order scattering peaks attributable to a microphase-separated structure be detected. If a secondary or higher-order scattering peak is detected, it suggests that the phase-separated structure is very highly ordered.

Microphase-separated structures are roughly divided into lamella structure, gyroid structure, cylinder structure, and sphere structure. The microphase-separated structure formed in a cured product of the epoxy resin composition according to the present invention is preferably one selected from these structures.

Available methods for examining a microphase-separated structure include transmission electron microscopic observation and scanning electron microscopic observation of a cross section of the cured resin. If necessary, the specimen may be dyed with osmium before observation. Dyeing can be carried out by a common method.

For a specimen that gives a secondary or higher-degree scattering peak in small angle X-ray scattering observation, the type of the microphase-separated structure in cured resin can be determined from the value of $q_n/q_1$ where $q_n$ represents the value of the scattering vector of the n'th order scattering peak. A lamella structure is inferred if $q_n/q_1$ values are 1, 2, 3, ..., a cylinder structure inferred if they are 1, $3^{0.5}$, 2, $7^{0.5}$, ... and a sphere structure inferred if they are 1, $2^{0.5}$, $3^{0.5}$ ....

The microphase-separated structure formed in the cured product of an epoxy resin composition preferably has a structural period of 10 nm or more, more preferably 20 nm or more. If the structural period is less than 10 nm, the compatibility state may not be obvious and the microphase-separated structure may not have significant effect. Thus, the structural period is preferably 200 nm or less, more preferably 150 nm or less, and still more preferably 100 nm or less. If a structural period is more than 200 nm, the phase-separated structure may be too large and fail to develop good properties.

The structural period of such a microphase-separated structure can be examined by small angle X-ray scattering observation, transmission electron microscopic observation, and scanning electron microscopic observation. In the case of small angle X-ray scattering observation, the structural period $\Lambda_m$ can be calculated as $\Lambda_m=(\lambda/2)/\sin(\theta_m/2)$ where $\theta_m$ and $\lambda$ denote the scattering angle attributable to the scattering peak observed and the wavelength of the scattered light in the scattering body, respectively. In the case of electron microscopic observation, an image obtained by electron microscopic photography is analyzed by two-dimensional Fourier conversion to determine the circular average. Then, the wave number (k)-strength spectrum is obtained and the structural period $\Lambda_m$ is calculated from its peak by the relation $\Lambda_m=1/k$.

The epoxy resin composition according to the present invention may contain thermoplastic resin compounds that are soluble in epoxy compounds, organic particles such as rubber particles and thermoplastic resin particles, etc., unless they impair the effect of the present invention.

Preferred thermoplastic resins that are soluble in epoxy compounds include thermoplastic resins having a hydrogen-bonding functional group, which are expected to ensure improved adhesion between an epoxy resin composition and reinforcing fiber. Effective hydrogen-bonding functional groups include alcoholic hydroxyl groups, amide bonds, sulfonyl groups, and carboxyl groups.

Thermoplastic resins having an alcoholic hydroxyl group include polyvinyl alcohol and phenoxy resins as well as polyvinyl acetal resins such as polyvinyl formal and polyvinyl butyral. Thermoplastic resins having an amide bond include polyamide, polyimide, polyamide-imide, and polyvinyl pyrolidone. Thermoplastic resins having a sulfonyl group include polysulfone. Such polyamide, polyimide, and polysulfone may contain, in their backbone chain, an ether bond or a functional group such as carbonyl group. In such polyamide, the nitrogen atom in the amide group may have a substituent group. Thermoplastic resins having a carboxyl group include polyester, polyamide, and polyamide-imide.

Commercially available products of thermoplastic resin that are soluble in epoxy resin compounds and have a hydrogen-bonding functional group include polyvinyl acetal resin products such as Denka Butyral; polyvinyl alcohol resin products such as Denka Poval (registered trademark) (manufactured by Denki Kagaku Kogyo Kabushiki Kaisha) and Vinylec (registered trademark) (manufactured by Chisso Corporation); polyamide resin products such as Macromelt (registered trademark) (manufactured by Henkel Hakusui Corporation) and Amilan (registered trademark) CM4000 (manufactured by Toray Industries, Inc.); polyimide products such as Ultem (registered trademark) (manufactured by SABIC Innovative Plastics IP BV), Aurum (registered trademark) (manufactured by Mitsui Chemicals, Inc.), and Vespel (registered trademark) (manufactured by DuPont); PEEK polymers such as Victrex (registered trademark) (manufactured by Victrex PLC); polysulfone products such as UDEL (registered trademark) (manufactured by Solvay Advanced Polymers, L.L.C.); and polyvinyl pyrolidone products such as Luviskol (registered trademark) (manufactured by BASF Japan).

High in compatibility with epoxy resin, acrylic resin is widely used for viscoelasticity control. Commercially available products of such acrylic resin include Dianal (registered trademark) BR series (manufactured by Mitsubishi Rayon Co., Ltd.), and Matsumoto Microsphere (registered trademark) M, M100, and M500 (Matsumoto Yushi-Seiyaku Co., Ltd.).

From the viewpoint of handleability etc., it is preferable that the aforementioned rubber particles be crosslinked rubber particles or core-shell rubber particles consisting of crosslinked rubber particles and a heterogeneous polymer graft-polymerized to their surfaces.

Commercial products of such core shell rubber particles include, for instance, Paraloid (registered trademark) EXL-2655, EXL-2611, and EXL-3387 (manufactured by Rohm and Haas), which contains a butadiene-alkyl methacrylate-styrene copolymer, Stafiloid (registered trademark) AC-3355 and TR-2122 (manufactured by Ganz), which contains an acrylate-methacrylate copolymer, Nanostrength (registered trademark) M22, 51, 52, and 53 (manufactured by Arkema), and Kane Ace (registered trademark) MX series (manufactured by Kaneka Corporation).

Preferred thermoplastic resin particles include polyamide particles and polyimide particles. Commercially available products of polyamide particles include SP-500 (manufactured by Toray Industries, Inc.) and Orgasol (registered trademark) (manufactured by Arkema).

In addition, the epoxy resin composition according to the present invention may also contain other various additives unless they impair the effects of the present invention. Such other additives include, for example, reinforcement materials or non-plate-like filling materials of talc, kaolin, mica, clay, bentonite, sericite, basic magnesium carbonate, aluminum hydroxide, glass flake, glass fiber, carbon fiber, asbestos fiber, rock wool, calcium carbonate, silica sand, wollastonite, barium sulfate, glass beads, or titanium oxide; antioxidants (phosphorus based, sulfur based, etc.); ultraviolet absorbers; thermal stabilizers (hindered phenol based, etc.); lubricants; mold releasing agents; antistatic agents; antiblocking agents; coloring agents including dyes and pigments; flame retardants (halogen based, phosphorus basxed, etc.); flame retardation assistant (antimony compounds, such as antimony trioxide, zirconium oxide, molybdenum oxide, etc.); foaming agents; coupling agents (titanium coupling agents and silane coupling agents containing one or more of the following: epoxy groups, amino groups, mercapto groups, vinyl groups, and isocyanate groups); and antibacterial agents.

Prepreg can also be produced by combining the epoxy resin composition according to the present invention with reinforcing fiber.

There are no specific limitations on the reinforcing fiber to be used for the present invention, and useful ones include glass fiber, carbon fiber, aramid fiber, boron fiber, alumina fiber, and silicon carbide fiber. A plurality of these fibers may be used as a mixture. Of these, carbon fiber is preferred because it serves to produce lightweight, highly rigid fiber reinforced composite materials. In particular, carbon fibers with a tensile modulus of 230 to 800 GPa are preferred. The advantageous effect of the invention tends to be manifested remarkably to ensure high impact resistance when such carbon fiber with high elastic modulus is combined with the epoxy resin composition according to the present invention.

There are no specific limitations on the shape of the reinforcing fiber, which may be, for example, in the form of long fiber paralleled in one direction, tow, woven fabric, mat, knit, braid, or short fiber. Long fiber as referred to herein consists of monofilaments or fiber bundles that are substantially continuous over a length of 10 mm or more. Short fiber consists of fiber bundles cut to less than 10 mm. In particular, a structure consisting of reinforcing fiber bundles paralleled in one direction is the most suitable for uses in which high specific strength and specific modulus are required.

Prepreg can be produced by impregnating reinforcing fiber with an epoxy resin composition. Useful impregnation methods include wet methods and hot melt methods (dry methods).

In a wet method, an epoxy resin composition is dissolved in a solvent such as methyl ethyl ketone and methanol to prepare a solution, followed by immersing reinforcing fiber in it, pulling up the reinforcing fiber, and evaporating the solvent from the reinforcing fiber using an oven etc. to achieve the impregnation of the reinforcing fiber with the epoxy resin composition. In a hot melt method, an epoxy resin composition, with its viscosity decreased by heating, is used to directly impregnate reinforcing fiber. Alternatively, films are prepared by coating release paper or the like with an epoxy resin composition and the films are used to cover either or both sides of a reinforcing fiber sheet and pressed under heat to achieve the impregnation of the reinforcing fiber with the epoxy resin composition. Of these, the use of a hot melt method is preferred because the resulting prepreg is free of residual solvent.

The quantity of reinforcing fiber per unit area of a prepreg sheet is preferably 70 to 200 g/m$^2$. If this quantity of reinforcing fiber is less than 70 g/m$^2$, a larger number of sheets have to be stacked to ensure a required thickness when molding fiber reinforced composite material, possibly leading to troublesome stacking operation. If this quantity of reinforcing fiber is more than 200 g/m$^2$, on the other hand, the prepreg tends to have poor drape properties. The content of fiber in a prepreg sheet is preferably 60 to 90 mass %, more preferably 65 to 85 mass %, and still more preferably 70 to 80 mass %. If the fiber content is less than 60 mass %, the resin content is so large that the advantage of fiber reinforced composite material having a high specific strength and specific modulus will be lost and the epoxy resin composition will release an excessively large amount of heat during curing. If the fiber content is more than 90 mass %, the resin may fail to be impregnated properly, possibly resulting in fiber reinforced composite material containing many voids.

Fiber reinforced composite material can be obtained by curing the prepreg described above. Instead of using the intermediate of prepreg, fiber reinforced composite material can also be produced by combining the epoxy resin composition according to the present invention with reinforcing fiber, followed by curing.

There are no specific limitations on the method to be used for producing fiber reinforced composite material, and useful methods include prepreg lamination, resin transfer molding, resin film infusion, hand lay-up, sheet molding compound method, filament winding, and pultrusion.

In the resin transfer molding method, a reinforcing fiber base is directly impregnated with a liquid epoxy resin composition, followed by curing. Since intermediates such as prepreg are not used, this method is potentially low in molding cost and suitable for the production of structural members of spacecraft, aircraft, railroad vehicles, automobiles, and ships.

In the filament winding method, one to several tens of roved fiber bundles are paralleled and impregnated with an epoxy resin composition while applying a tension, and wound on a rotating mandrel, while maintaining a predetermined angle, up to a predetermined thickness, followed by curing the epoxy resin composition and removing the mandrel.

In the pultrusion method, a sheet of reinforcing fiber is passed continuously through an impregnation tank filled with a liquid epoxy resin composition and the reinforcing fiber impregnated with the epoxy resin composition is passed through a squeeze die and a heated die. Then, it is molded and cured as it is pultruded continuously by a pultruding machine. Able to perform continuous molding of fiber reinforced composite material, this method has been used for the production of fishing rods, rods, pipes, sheets, antennas, and reinforcing fiber plastics (FRP) for building structures.

In the prepreg lamination method, prepreg sheets are shaped and/or stacked and then the epoxy resin composition is heat-cured while applying a pressure to the shaped and/or stacked prepreg.

For the prepreg lamination method, the application of heat and pressure is carried out by using an appropriate method such as press molding, autoclave molding, bagging molding, wrapping tape molding, and internal pressure molding.

In the autoclave molding method, a prepreg sheet is put on a tool plate of a predetermined shape and covered with bagging film, followed by curing under pressure and heat while deaerating the layered body. This method is able to control the fiber orientation accurately and free of the generation of voids and accordingly, it serves to produce high quality moldings with good mechanical characteristics. The pressure to be applied during the molding process is preferably 3 to 20 kg/cm$^2$. The molding temperature is preferably in the range of 90° C. to 200° C.

In the wrapping tape method, a prepreg sheet is wound on a core bar such as mandrel to mold a tubular article of fiber reinforced composite material. This method is suitable for the production of rod-like products such as golf shaft and fishing rod. More specifically, a prepreg sheet is wound on a mandrel and a wrapping tape of thermoplastic film, which is designed for fixation of and pressure application to the prepreg, is further wound outside the wound-up prepreg, followed by applying a tension. This body is heated in an oven to cure the resin and then the mandrel is pulled out to provide a tubular article. The tension applied by the wrapping tape to the prepreg is preferably 2.0 to 8.0 kgf. The molding temperature is preferably in the range of 80° C. to 200° C.

In the internal pressure molding method, a preform formed of an internal pressure-applying member such as a tube of thermoplastic resin wound with a prepreg sheet is fixed in a mold, and high pressure gas is introduced into the internal pressure-applying member to apply pressure while heating the mold simultaneously to produce a molded article. The internal pressure molding method has been preferred for the molding of articles of a complicated shape such as golf shaft, bat, and rackets for tennis or badminton. The pressure to be applied during the molding process is preferably 5 to 20 kg/cm$^2$. The molding temperature is preferably in the range of room temperature to 200° C., more preferably 80° C. to 180° C.

Of these methods, the prepreg lamination method is preferred because fiber reinforced composite material with high rigidity and strength can be produced.

Fiber reinforced composite materials containing a cured product of the epoxy resin composition according to the present invention as matrix resin are used favorably for producing sports goods, general industrial products, and aerospace components. More specifically, applications in the sporting goods industry include golf shaft, fishing rod, rackets for tennis, badminton, etc., hockey stick, and skiing pole. The aforementioned general industrial applications include structural members of vehicles such as automobile, bicycle, ship, and railroad vehicle as well as drive shaft, plate spring, windmill blade, pressure vessel, flywheel, roller for paper manufacture, roofing material, cable, and mending/reinforcing materials.

EXAMPLES

The epoxy resin composition according to the present invention will now be illustrated in more detail with reference to Examples, but it should be understood that the invention is not construed as being limited to these examples. The following resin materials were used to prepare epoxy resin compositions in each of the Examples.
<Epoxy Compound>
- bisphenol A type epoxy compound (YD-128, 189 epoxy equivalents, manufactured by Nippon Steel Chemical Co., Ltd.)
- triglycidyl-p-aminophenol (jER (registered trademark) 630, 97.5 epoxy equivalents, manufactured by Mitsubishi Chemical Corporation)
- bisphenol A type epoxy resin (jER (registered trademark) 1004, 975 epoxy equivalents, manufactured by Mitsubishi Chemical Corporation)

<Polymerization of Block Copolymer>
- n-butyl acrylate (manufactured by Sigma-Aldrich)
- glycidyl methacrylate (manufactured by Kanto Chemical Co., Inc.)
- copper (I) bromide (manufactured by Kanto Chemical Co., Inc.)
- copper (I) chloride (manufactured by Kanto Chemical Co., Inc.)
- N,N,N',N'',N''-pentamethyl diethylene triamine (manufactured by Sigma-Aldrich)
- dimethyl 2,6-dibromoheptane dioate (manufactured by Sigma-Aldrich)
- diphenyl ether (manufactured by Sigma-Aldrich)
- xylene (manufactured by Kanto Chemical Co., Inc.)

<Curing Agent>
- 4-methyl-2-ethyl imidazole (manufactured by Wako Pure Chemical Industries, Ltd.)
- dicyandiamide (DICY7, manufactured by Mitsubishi Chemical Corporation)
- 3,3'-diaminodiphenyl sulfone <Curing Accelerator>
- 3-(3,4-dichlorophenyl)-1,1-dimethylurea (DCMU99, manufactured by Hodogaya Chemical Co., Ltd.)

Preparation of resins and determination of various properties were carried out by the methods described below. Determination of these properties was performed in an environment with a temperature of 23° C. and relative humidity of 50% unless otherwise specified.

(1) Synthesis of Block Copolymer

Polymers were synthesized as described in the synthesis examples given below. Each of the resulting block copolymers is a triblock copolymer represented as ABA where A and B denote the aforementioned polymer block (a) and the aforementioned polymer block (b), respectively, and glycidyl methacrylate accounts for 100 mass % in the polymer block (a) while butyl acrylate also accounts for 100 mass % in the polymer block (b).

Synthesis Example 1

First, 95 g of n-butyl acrylate, 0.45 g of N,N,N',N'',N''-pentamethyl diethylene triamine, and 10 g of xylene was put in a flask and subjected to nitrogen bubbling for 20 minutes, followed by adding 0.37 g of copper (I) bromide. To this, 5 g of acrylic n-butyl acid bubbled with nitrogen gas and 0.9 g dimethyl-2,6-dibromoheptane dioate were added and polymerization was started in a water bath at 85° C. After 120 minutes, the resulting polymerization solution was cooled in ice water and diluted with acetone to end the reaction. The sequential operation of adding alumina to the solution, stirring it, and separating the supernatant liquid was repeated three times to remove the metal components. Subsequently, the solution was heated at 100° C. for one hour under reduced pressure using an evaporator to remove the solvent and remaining monomers, thereby providing an n-butyl acrylate polymer (PBA1). The molecular weight of the resulting polymer was measured by GPC as described in section (3) below. The weight average molecular weight was 49,000 and the molecular weight distribution was 1.28.

Synthesis Example 2

First, 95 g of n-butyl acrylate and 0.34 g of N,N,N',N'',N''-pentamethyl diethylene triamine was put in a flask and subjected to nitrogen bubbling for 20 minutes, followed by adding 0.28 g of copper (I) bromide. To this, 5 g of acrylic n-butyl acid bubbled with nitrogen gas and 0.68 g dimethyl-2,6-dibromoheptane dioate were added and polymerization was started in a water bath at 80° C. After 180 minutes, the resulting polymerization solution was cooled in ice water and diluted with acetone to end the reaction. The sequential operation of adding alumina to the solution, stirring it, and separating the supernatant liquid was repeated three times to remove the metal components. Subsequently, the solution was heated at 100° C. for one hour under reduced pressure using an evaporator to remove the solvent and remaining monomers, thereby providing an n-butyl acrylate polymer (PBA2). The molecular weight of the resulting polymer was measured by GPC as described in section (3) below. The weight average molecular weight was 75,200 and the molecular weight distribution was 1.23.

Synthesis Example 3

First, 80 g of PBA2 prepared in Synthesis example 2, 0.27 g of N,N,N',N'',N''-pentamethyl diethylene triamine, and 100 g of n-butyl acrylate were put in a flask, stirred, and subjected to nitrogen bubbling for 30 minutes. To the uniformly mixed solution, 0.23 g of copper (I) chloride was added and polymerization was started in a water bath at 80° C. After 210 minutes, the resulting polymerization solution was cooled in ice water and diluted with acetone to end the reaction. The sequential operation of adding alumina to the solution, stirring it, and separating the supernatant liquid was repeated three times to remove the metal components. Subsequently, the solution was heated at 100° C. for one hour under reduced pressure using an evaporator to remove the solvent and remaining monomers, thereby providing an n-butyl acrylate polymer (PBA3). The molecular weight of the resulting polymer was measured by GPC as described in section (3) below. The weight average molecular weight was 127,500 and the molecular weight distribution was 1.28.

Synthesis Example 4

First, 75 g of n-butyl acrylate and 1.09 g of N,N,N',N'',N''-pentamethyl diethylene triamine were put in a flask and subjected to nitrogen bubbling for 20 minutes, followed by adding 0.89 g of copper (I) bromide. To this, 5 g of acrylic n-butyl acid bubbled with nitrogen gas and 2.16 g dimethyl-2,6-dibromoheptane dioate were added and polymerization was started in a water bath at 80° C. After 120 minutes, the resulting polymerization solution was cooled in ice water and diluted with acetone to end the reaction. The sequential operation of adding alumina to the solution, stirring it, and separating the supernatant liquid was repeated three times to remove the metal components. Subsequently, the solution was heated at 100° C. for one hour under reduced pressure using an evaporator to remove the solvent and remaining monomers, thereby providing an n-butyl acrylate polymer (PBA4). The molecular weight of the resulting polymer was measured by GPC as described in section (3) below. The weight average molecular weight was 19,400 and the molecular weight distribution was 1.26.

Synthesis Example 5

First, 75 g of n-butyl acrylate and 2.17 g of N,N,N',N'',N''-pentamethyl diethylene triamine was put in a flask and subjected to nitrogen bubbling for 20 minutes, followed by adding 1.79 g of copper (I) bromide. To this, 5 g of acrylic n-butyl acid bubbled with nitrogen gas and 4.33 g dimethyl-2,6-dibromoheptane dioate were added and polymerization was started in a water bath at 80° C. After 60 minutes, the resulting polymerization solution was cooled in ice water and diluted with acetone to end the reaction. The sequential operation of adding alumina to the solution, stirring it, and separating the supernatant liquid was repeated three times to remove the metal components. Subsequently, the solution was heated at 100° C. for one hour under reduced pressure using an evaporator to remove the solvent and remaining monomers, thereby providing an n-butyl acrylate polymer (PBA5). The molecular weight of the resulting polymer was measured by GPC as described in section (3) below. The weight average molecular weight was 9,500 and the molecular weight distribution was 1.22.

Synthesis Example 6

First, 15 g of PBA1 prepared in Synthesis example 1, 0.06 g of N,N,N',N'',N''-pentamethyl diethylene triamine, 20 g of diphenyl ether, and 5 g of glycidyl methacrylate were put in a flask, stirred, and subjected to nitrogen bubbling for 10 minutes. To the uniformly mixed solution, 0.035 g of copper (1) chloride was added and polymerization was started in a water bath at 50° C. After 30 minutes, the polymerization solution was dripped in methanol to obtain a polymer deposit, which was washed with methanol. The resulting deposit was dissolved in acetone and passed through an active alumina column to remove the metal components. Subsequently, the solution was vacuum-dried by removing acetone at room temperature under reduced pressure using a rotary evaporator to provide a block copolymer (BCP1). The molecular weight of the resulting polymer was measured by GPC as described in section (3) below. The weight average molecular weight was 61,900 and the molecular weight distribution was 1.27. The proportion of the glycidyl methacrylate polymer was determined using NMR as described in section (4) below. The glycidyl methacrylate polymer was found to account for 10 mass % of the entire copolymer.

Synthesis Example 7

Except for continuing polymerization for 60 minutes, the same procedure as in Synthesis example 6 was carried out to produce a block copolymer (BCP2). The molecular weight of the resulting polymer was measured by GPC as described in section (3) below. The weight average molecular weight was 68,900 and the molecular weight distribution was 1.32.

The proportion of the glycidyl methacrylate polymer was determined using NMR as described in section (4) below. The glycidyl methacrylate polymer was found to account for 20 mass % of the entire copolymer.

Synthesis Example 8

Except for adding of 60 g of diphenyl ether and continuing polymerization for 180 minutes, the same procedure as in Synthesis example 6 was carried out to produce a block copolymer (BCP3). The molecular weight of the resulting polymer was measured by GPC as described in section (3) below. The weight average molecular weight was 75,500 and the molecular weight distribution was 1.32. The proportion of the glycidyl methacrylate polymer was determined using NMR as described in section (4) below. The glycidyl methacrylate polymer was found to account for 30 mass % of the entire copolymer.

Synthesis Example 9

Except for continuing polymerization for 10 minutes, the same procedure as in Synthesis example 6 was carried out to produce a block copolymer (BCP4). The molecular weight of the resulting polymer was measured by GPC as described in section (3) below. The weight average molecular weight was 57,000 and the molecular weight distribution was 1.20. The proportion of the glycidyl methacrylate polymer was determined using NMR as described in section (4) below. The glycidyl methacrylate polymer was found to account for 3 mass % of the entire copolymer.

Synthesis Example 10

First, 22 g of PBA2 prepared in Synthesis example 2, 0.06 g of N,N,N',N'',N''-pentamethyl diethylene triamine, 60 g of diphenyl ether, and 20 g of glycidyl methacrylate were put in a flask, stirred, and subjected to nitrogen bubbling for 30 minutes. To the uniformly mixed solution, 0.035 g of copper (I) chloride was added and polymerization was started in a water bath at 50° C. After 45 minutes, the polymerization solution was dripped in methanol to obtain a polymer deposit, which was washed with methanol. The resulting deposit was dissolved in acetone and passed through an active alumina column to remove the metal components. Subsequently, the solution was vacuum-dried by removing acetone at room temperature under reduced pressure using a rotary evaporator to provide a block copolymer (BCP5). The molecular weight of the resulting polymer was measured by GPC as described in section (3) below. The weight average molecular weight was 87,200 and the molecular weight distribution was 1.30. The proportion of the glycidyl methacrylate polymer was determined using NMR as described in section (4) below. The glycidyl methacrylate polymer was found to account for 13 mass % of the entire copolymer.

Synthesis Example 11

Except for continuing polymerization for 30 minutes, the same procedure as in Synthesis example 10 was carried out to produce a block copolymer (BCP6). The molecular weight of the resulting polymer was measured by GPC as described in section (3) below. The weight average molecular weight was 83,500 and the molecular weight distribution was 1.32. The proportion of the glycidyl methacrylate polymer was determined using NMR as described in section (4)

below. The glycidyl methacrylate polymer was found to account for 9 mass % of the entire copolymer.

Synthesis Example 12

First, 26 g of PBA3 prepared in Synthesis example 3, 0.05 g of N,N,N',N'',N''-pentamethyl diethylene triamine, 90 g of diphenyl ether, and 15 g of glycidyl methacrylate were put in a flask, stirred, and subjected to nitrogen bubbling for 30 minutes. To the uniformly mixed solution, 0.029 g of copper (I) chloride was added and polymerization was started in a water bath at 50° C. After 150 minutes, the polymerization solution was dripped in methanol to obtain a polymer deposit, which was washed with methanol. The resulting deposit was dissolved in acetone and passed through an active alumina column to remove the metal components. Subsequently, the solution was vacuum-dried by removing acetone at room temperature under reduced pressure using a rotary evaporator to provide a block copolymer (BCP7). The molecular weight of the resulting polymer was measured by GPC as described in section (3) below. The weight average molecular weight was 157,500 and the molecular weight distribution was 1.49. The proportion of the glycidyl methacrylate polymer was determined using NMR as described in section (4) below. The glycidyl methacrylate polymer was found to account for 15 mass % of the entire copolymer.

Synthesis Example 13

Except for continuing polymerization for 60 minutes, the same procedure as in Synthesis example 12 was carried out to produce a block copolymer (BCP8). The molecular weight of the resulting polymer was measured by GPC as described in section (3) below. The weight average molecular weight was 130,200 and the molecular weight distribution was 1.33. The proportion of the glycidyl methacrylate polymer was determined using NMR as described in section (4) below. The glycidyl methacrylate polymer was found to account for 4 mass % of the entire copolymer.

Synthesis Example 14

First, 16 g of PBA4 prepared in Synthesis example 4, 0.20 g of N,N,N',N'',N''-pentamethyl diethylene triamine, 50 g of diphenyl ether, and 50 g of glycidyl methacrylate were put in a flask, stirred, and subjected to nitrogen bubbling for 30 minutes. To the uniformly mixed solution, 0.11 g of copper (I) chloride was added and polymerization was started in a water bath at 50° C. After 30 minutes, the polymerization solution was dripped in methanol to obtain a polymer deposit, which was washed with methanol. The resulting deposit was dissolved in acetone and passed through an active alumina column to remove the metal components. Subsequently, the solution was vacuum-dried by removing acetone at room temperature under reduced pressure using a rotary evaporator to provide a block copolymer (BCP9). The molecular weight of the resulting polymer was measured by GPC as described in section (3) below. The weight average molecular weight was 60,500 and the molecular weight distribution was 1.46. The proportion of the glycidyl methacrylate polymer was determined using NMR as described in section (4) below. The glycidyl methacrylate polymer was found to account for 66 mass % of the entire copolymer.

Synthesis Example 15

First, 19 g of PBA4 prepared in Synthesis example 4, 0.24 g of N,N,N',N'',N''-pentamethyl diethylene triamine, 50 g of diphenyl ether, and 20 g of glycidyl methacrylate were put in a flask, stirred, and subjected to nitrogen bubbling for 30 minutes. To the uniformly mixed solution, 0.14 g of copper (I) chloride was added and polymerization was started in a water bath at 50° C. After 30 minutes, the polymerization solution was dripped in methanol to obtain a polymer deposit, which was washed with methanol. The resulting deposit was dissolved in acetone and passed through an active alumina column to remove the metal components. Subsequently, the solution was vacuum-dried by removing acetone at room temperature under reduced pressure using a rotary evaporator to provide a block copolymer (BCP10). The molecular weight of the resulting polymer was measured by GPC as described in section (3) below. The weight average molecular weight was 40,800 and the molecular weight distribution was 1.48. The proportion of the glycidyl methacrylate polymer was determined using NMR as described in section (4) below. The glycidyl methacrylate polymer was found to account for 47 mass % of the entire copolymer.

Synthesis Example 16

First, 14 g of PBA5 prepared in Synthesis example 4, 0.36 g of N,N,N',N'',N''-pentamethyl diethylene triamine, 60 g of diphenyl ether, and 30 g of glycidyl methacrylate were put in a flask, stirred, and subjected to nitrogen bubbling for 30 minutes. To the uniformly mixed solution, 0.20 g of copper (I) chloride was added and polymerization was started in a water bath at 50° C. After 30 minutes, the polymerization solution was dripped in methanol to obtain a polymer deposit, which was washed with methanol. The resulting deposit was dissolved in acetone and passed through an active alumina column to remove the metal components. Subsequently, the solution was vacuum-dried by removing acetone at room temperature under reduced pressure using a rotary evaporator to provide a block copolymer (BCP11). The molecular weight of the resulting polymer was measured by GPC as described in section (3) below. The weight average molecular weight was 33,200 and the molecular weight distribution was 1.44. The proportion of the glycidyl methacrylate polymer was determined using NMR as described in section (4) below. The glycidyl methacrylate polymer was found to account for 66 mass % of the entire copolymer.

(2) Preparation of Epoxy Resin Composition

Preparation Example 1

An epoxy resin composition was prepared by adding the block copolymer prepared in one of Synthesis examples given above and a predetermined quantity of 4-methyl-2-ethyl imidazole, which was used as curing agent, to an epoxy compound to a degree where a mutually dissolved state was developed.

Preparation Example 2

An epoxy resin composition was prepared by adding the block copolymer prepared in one of Synthesis examples given above to an epoxy compound to a degree where a mutually dissolved state was developed, followed by adding predetermined quantities of dicyandiamide and 3-(3,4-dichlorophenyl)-1,1-dimethylurea, which were used as curing agents.

Preparation Example 3

An epoxy resin composition was prepared by adding the block copolymer prepared in one of Synthesis examples given above to an epoxy compound to a degree where a mutually dissolved state was developed, followed by adding a predetermined quantity of 4,4'-diaminodiphenyl sulfone, which was used as curing agent.

(3) Preparation of Cured Product of Epoxy Resin Composition

Preparation Example 4

The epoxy resin composition prepared in Preparation example 1 was heated for one hour in a hot air oven heated at 150° C. to provide a cured product.

Preparation Example 5

The epoxy resin composition prepared in Preparation example 2 was heated in a hot air oven from room temperature at a rate of 2° C./min and maintained at 135° C. for 2 hours to provide a cured product.

Preparation Example 6

The epoxy resin composition prepared in Preparation example 3 was heated in a hot air oven from room temperature at a rate of 2° C./min and maintained at 180° C. for 2 hours to provide a cured product.

(4) Measurement of Weight Average Molecular Weight and Molecular Weight Distribution The weight average molecular weight and molecular weight distribution were determined by gel permeation chromatography (GPC). The weight average molecular weight and molecular weight distribution were measured by using a Shimadzu GPC system (LC-20AD, CBM-20A, RID-10A, SPD-M20A, CTO-20A, SIL-20$A_{HT}$, and DGU-20$A_3$), tetrahydrofuran as solvent, two Shodex (registered trademark) 80M columns (manufactured by Showa Denko K.K.), one Shodex (registered trademark) 802 column (manufactured by Showa Denko K.K.), and a RI (differential refractive index) detector. A 0.3 µL sample was injected and the retention time of the sample was measured at a flow rate of 1 mL/min and converted into a molecular weight based on the retention time of a calibration sample for polymethyl methacrylic acid. Then, the molecular weight distribution (Mn/Mw) was calculated from the number average molecular weight (Mn) and weight average molecular weight (Mw) thus determined.

(5) Proportion of Polymer Block

Here, the proportion of a polymer block to the entire block copolymer was determined by $^1$H-NMR analysis using deuterated chloroform as solvent. In the case of a block copolymer composed of a glycidyl methacrylate polymer and a n-butyl acrylate polymer, for example, the proportion (by mass) of the glycidyl methacrylate polymer was calculated from the ratio between the peak area attributable to the glycidyl group in the glycidyl methacrylate polymer and the peak area attributable to the alkyl group in the butyl acrylate polymer.

(6) Small Angle X-Ray Scattering Observation of Cured Product

One of the epoxy resin compositions prepared above was cured in a mold set to a thickness of 0.1 mm using a Teflon (registered trademark) spacer to provide cured resin with a thickness of 0.1 mm. A 5 mm width×25 mm length specimen was cut out of this resin and put in a film sample cell and scattering observation was carried out using a small angle X-ray scattering system (SAXSess mc$^2$ module type nanostructure analyzer, manufactured by Anton Paar). Observation was performed using a line source of X-ray with a wavelength of 1.54 angstrom and a SAXS imaging plate as detector for an integration time of 3 minutes. For the resulting two dimensional image, integration was performed for 10 pixels in the direction perpendicular to the line light using analysis software SAXSquant 3.80. The resulting one dimensional scattering profile was examined to check for peaks and, in the case where one or more peaks occurred, the structural period $\Lambda_m$ was calculated as $\Lambda_m=(\lambda/2)/\sin(\theta_m/2)$ where $\theta_m$ and $\lambda$ denote the scattering angle attributable to the primary scattering peak and the wavelength of the scattered light in the scattering body, respectively. In addition, the ratio of X/Y where X and Y are the half-width of the primary scattering peak and the maximum wave number of the peak was calculated.

(7) Electron Microscopic Observation of Cured Product (Checking for Microphase-Separated Structure)

Cured resin prepared above was dyed, sectioned, and observed by transmission electron microscopy at an appropriate magnification under the following conditions to provide a transmission electron microscopic image, which was examined to check for a microphase-separated structure. As the dyeing agent, either $OsO_4$ or $RuO_4$ that was suitable for the resin composition was used to ensure a required contrast to permit easy morphological examination. The above-mentioned appropriate magnification means 50,000 times for a structural period of 1 nm or more and less than 10 nm as determined by small angle X-ray scattering, 20,000 times for a structural period of 10 nm or more and less than 100 nm, 2,000 times for a structural period of 100 nm or more and less than 1,000 nm, and 1,000 times for a structural period of 1,000 nm or more.

Equipment: H-7100 transmission electron microscope (manufactured by Hitachi, Ltd.)

Accelerating voltage: 100 kV (8) Measurement of Bending Elastic Modulus and Bending Rupture Elongation of Cured Epoxy Resin The resulting epoxy resin composition was cured in a mold set to a thickness of 2 mm using a 2 mm thick Teflon (registered trademark) spacer to provide cured resin with a thickness of 2 mm. A test piece with a size of 10 mm width×60 mm length was cut out of this resin and subjected to three point bending test according to JIS K7171 (2008) using an Instron type universal tester under the conditions of a maximum load cell capacity of 5 kN, a span distance of 32 mm, and a crosshead speed of 100 mm/min, and results were used to determine the bending elastic modulus and deflection in bending. Measurements were taken for 5 samples and they were averaged to provide the values of bending elastic modulus and bending deflection. The span distance was 24 mm for Examples 14 to 16 and Comparative examples 7 and 8 while measurements were taken under the conditions described above for the other cases.

(9) Measurement of Toughness of Cured Resin

The resulting epoxy resin composition was cured in a mold set to a thickness of 6 mm using a 6 mm thick Teflon (registered trademark) spacer to provide cured resin with a thickness of 6 mm. This cured resin was cut to prepare a test piece with a size of 12.7 mm×150 mm. Using an Instron type universal tester (manufactured by Instron Corporation), the test piece was processed and tested according to ASTM D5045 (1999). An initial precrack was introduced in the test piece by putting the edge of a razor cooled to the liquid nitrogen temperature on the test piece and giving an impact to the razor using a hammer. The toughness of resin referred to herein means the critical stress intensity for mode-1 (opening-mode) deformation.

(10) Measurement of Heat Resistance

The epoxy resin composition prepared in Preparation example 2 was cured in a mold set to a thickness of 2 mm using a 2 mm thick Teflon (registered trademark) spacer to provide cured resin with a thickness of 2 mm. A test piece with a size of 10 mm width×50 mm length was cut out of this resin and subjected to twist mode dynamic viscoelasticity measurement using a measuring jig unit in a MCR501 rheometer (manufactured by Anton Paar). Measurements were taken while heating the test piece in a nitrogen atmosphere from 50° C. to 250° C. at a heating rate of 10° C./min under the conditions of a chuck-to-chuck distance of 40 mm, strain of 0.05%, and frequency of 1 Hz. The resulting values of storage elastic modulus (G') and loss elastic modulus (G") were used to calculate tan δ (=G"/G') and the temperature corresponding to its maximum was employed as indicator of the heat resistance.

(11) Preparation of Unidirectional Prepreg

Using a reverse roll coater, the epoxy resin composition prepared in Preparation example 2 was applied to pieces of release paper to prepare resin film sheets. Then, a resin film sheet was put on each surface of a sheet of unidirectionally aligned carbon fiber Torayca (registered trademark) T800H (manufactured by Toray Industries, Inc.) and heated under pressure to allow the carbon fiber to be impregnated with the epoxy resin composition, thereby providing unidirectional prepreg with a carbon fiber weight per unit area of 125 g/m$^2$ and a fiber weight content of 75%.

(12) Preparation of Unidirectional Laminate of Fiber Reinforced Composite Material A total of 20 sheets of the unidirectional prepreg prepared in section (11) above were stacked with their fibers aligned in one direction. Subsequently, the laminate prepreg was covered with nylon film taking care not to leave gaps. This was heated for 2 hours under pressure in an autoclave at a temperature of 135° C. and internal pressure of 588 kPa to prepare a unidirectional laminate.

(13) Measuring Method for 0° Bending Strength of Fiber Reinforced Composite Material The 0° bending strength of unidirectional fiber reinforced composite material was measured to provide an indicator of the bending strength of the fiber reinforced composite material. A test piece with a thickness of 2 mm, width of 15 mm, and length of 100 mm was cut out of the unidirectional laminate prepared in section (12) above. The 0° bending strength and bending rupture elongation were measured using an Instron type universal tester (manufactured by Instron Corporation) under the conditions of a crosshead speed of 5.0 mm/min, span of 80 mm, indenter diameter of 10 mm, and fulcrum diameter 4 mm. The real value of Vf was determined from the metsuke (weight per unit surface area) of the prepreg prepared above, and then the resulting values of bending strength and bending rupture elongation were converted in terms of Vf60%.

(14) 90° Bending Strength of Fiber Reinforced Composite Material

The 90° bending strength of fiber reinforced composite material was measured to provide an indicator of the bonding strength between the epoxy resin composition and reinforcing fiber. A test piece with a thickness of 2 mm, width of 15 mm, and length of 60 mm was cut out of the unidirectional laminate prepared in section (12) above. The 90° bending strength and bending rupture elongation were measured using an Instron type universal tester (manufactured by Instron Corporation) under the conditions of a crosshead speed of 1.0 mm/min, span of 40 mm, indenter diameter of 10 mm, and fulcrum diameter 4 mm. The real value of Vf was determined from the metsuke (weight per unit surface area) of the prepreg prepared above, and then the resulting values of bending strength and bending rupture elongation were converted in terms of Vf60%.

Examples 1 to 9

An epoxy compound, block copolymer, and curing agent were blended as shown in Table 1 to prepare an epoxy resin composition and its cured product as described in Preparation example 1 and Preparation example 4. Small angle X-ray scattering measurement and electron microscopic observation showed that the cured product had a cylinder type microphase-separated structure. Measurements of various properties showed that the resulting cured products were high in bending elastic modulus, bending rupture elongation, and toughness.

Examples 10 to 13

An epoxy compound, block copolymer, and curing agent were blended as shown in Table 2 to prepare an epoxy resin composition and its cured product as described in Preparation example 2 and Preparation example 5. Small angle X-ray scattering measurement and electron microscopic observation showed that the cured product had a cylinder type microphase-separated structure. Measurements of various properties showed that the resulting cured products were high in bending elastic modulus, bending rupture elongation, and toughness. They were also high in heat resistance.

Examples 14 to 19

An epoxy compound, block copolymer, and curing agent were blended as shown in Table 2 to prepare an epoxy resin composition and its cured product as described in Preparation example 3 and Preparation example 6. Small angle X-ray scattering measurement and electron microscopic observation showed that the cured product had a cylinder type microphase-separated structure. Measurements of various properties showed that the resulting cured products were high in bending elastic modulus, bending rupture elongation, and toughness.

Comparative Example 1

Except for adding no block copolymer as shown in Table 3, the same procedures as in Preparation example 1 and Preparation example 4 were carried out to blend an epoxy compound and curing agent to produce an epoxy resin composition and its cured product. Small angle X-ray scattering measurement and electron microscopic observation showed that the cured product had no phase structure. Measurements of various properties showed that the resulting cured product was not sufficiently high in bending rupture elongation and toughness.

Comparative Example 2

An epoxy compound, polymer PBA1, and curing agent were blended as shown in Table 3 to prepare an epoxy resin composition and its cured product as described in Preparation example 1 and Preparation example 4. Small angle X-ray scattering measurement and electron microscopic observation showed that the cured product had a coarse phase structure instead of a microphase-separated structure. Measurements of various properties showed that the resulting cured product was not sufficiently high in bending elastic modulus and bending rupture elongation. In addition, toughness measurement showed that the test piece was too low in toughness to allow a precrack to be introduced.

Comparative Examples 3 to 6

An epoxy compound, block copolymer, and curing agent were blended as shown in Table 3 to prepare an epoxy resin composition and its cured product as described in Preparation example 1 and Preparation example 4. Small angle X-ray scattering measurement and electron microscopic observation showed that the cured product had a fine structure, but it was not highly ordered, indicating the absence of any microphase-separated structure. Measurements of various properties showed that the resulting cured product was not sufficiently high in bending rupture elongation and toughness.

Comparative examples 7 and 8

An epoxy compound, block copolymer, and curing agent were blended as shown in Table 3 to prepare an epoxy resin composition and its cured product as described in Preparation example 1 and Preparation example 4. The quantity of the polymer blocks of glycidyl methacrylate in each block copolymer was too small and accordingly, small angle X-ray scattering measurement and electron microscopic observation showed that the cured products had a coarse phase structure instead of a microphase-separated structure. Measurements of various properties showed that the resulting cured product was not sufficiently high in bending elastic modulus and bending rupture elongation. In addition, toughness measurement showed that the test piece was too low in toughness to allow a precrack to be introduced.

Comparative Example 9

Except for adding no block copolymer as shown in Table 3, the same procedures as in Preparation example 2 and Preparation example 5 were carried out to blend an epoxy compound and curing agent to produce an epoxy resin composition and its cured product. Small angle X-ray scattering measurement and electron microscopic observation showed that the cured product had no phase structure. Measurements of various properties showed that the resulting cured product was not sufficiently high in bending rupture elongation and toughness, although high in heat resistance.

Comparative Example 10

An epoxy compound, block copolymer, and curing agent were blended as shown in Table 3 to prepare an epoxy resin composition and its cured product as described in Preparation example 2 and Preparation example 5. The quantity of the polymer blocks of glycidyl methacrylate in each block copolymer was too small and accordingly, small angle X-ray scattering measurement and electron microscopic observation showed that the cured products had a coarse phase structure instead of a microphase-separated structure. Measurements of various properties showed that the resulting cured product was not sufficiently high in bending elastic modulus and bending rupture elongation and furthermore, it was lower in heat resistance. In addition, toughness measurement showed that the test piece was too low in toughness to allow a precrack to be introduced.

Comparative Examples 11 to 13

An epoxy compound, block copolymer, and curing agent were blended as shown in Table 4 to prepare an epoxy resin composition and its cured product as described in Preparation example 2 and Preparation example 5. Small angle X-ray scattering measurement and electron microscopic observation showed that the cured product had a fine structure, but it was not highly ordered, indicating the absence of any microphase-separated structure. Measurements of various properties showed that the resulting cured product was not sufficiently high in bending rupture elongation and toughness, although high in heat resistance.

Comparative Examples 14 and 15

Except for adding no block copolymer as shown in Table 4, the same procedures as in Preparation example 3 and Preparation example 6 were carried out to blend an epoxy compound, block copolymer, and curing agent to produce an epoxy resin composition and its cured product. Small angle X-ray scattering measurement and electron microscopic observation showed that the cured product had a fine structure, but it was not highly ordered, indicating the absence of any microphase-separated structure. Measurements of various properties showed that the resulting cured product was not sufficiently high in bending rupture elongation and toughness.

Comparative Examples 16 and 17

An epoxy compound, block copolymer, and curing agent were blended as shown in Table 4 to prepare an epoxy resin composition and its cured product as described in Preparation example 3 and Preparation example 6. The quantity of the polymer blocks of glycidyl methacrylate in each block copolymer was too small and accordingly, small angle X-ray scattering measurement and electron microscopic observation showed that the cured products had a coarse phase structure instead of a microphase-separated structure. Measurements of various properties showed that the resulting cured product was not sufficiently high in bending elastic modulus and bending rupture elongation. In addition, toughness measurement showed that the test piece was too low in toughness to allow a precrack to be introduced.

Comparative Examples 18 to 20

An epoxy compound, block copolymer, and curing agent were blended as shown in Table 4 to prepare an epoxy resin composition and its cured product as described in Preparation example 3 and Preparation example 6. Small angle X-ray scattering measurement and electron microscopic observation showed that the cured product had a fine structure, but it was not highly ordered, indicating the absence of any microphase-separated structure. Measurements of various properties showed that the resulting cured product was not sufficiently high in bending rupture elongation and toughness.

Examples 20 to 23

As shown in Table 5, the procedure described in Preparation example 2 was carried out to prepare an epoxy resin composition and the procedure described in section (12) was carried out to produce a unidirectional laminate of fiber reinforced composite material. Results of 0° and 90° bending test showed that the laminate was high in both bending strength and bending rupture elongation.

Comparative Example 21

As shown in Table 5, the procedure described in Preparation example 2 was carried out to prepare an epoxy resin composition and the procedure described in section (12) was carried out to produce a unidirectional laminate of fiber reinforced composite material. Results of 0° and 90° bending test showed that the laminate was not sufficiently high in bending rupture elongation.

Comparative Example 22

As shown in Table 5, the procedure described in Preparation example 2 was carried out to prepare an epoxy resin composition and the procedure described in section (12) was carried out to produce a unidirectional laminate of fiber reinforced composite material. Results of 0° and 90° bending test showed that the laminate was not sufficiently high in both bending strength and bending rupture elongation.

Comparative Example 23

As shown in Table 5, the procedure described in Preparation example 2 was carried out to prepare an epoxy resin composition and the procedure described in section (12) was carried out to produce a unidirectional laminate of fiber reinforced composite material. Results of 0° and 90° bending test showed that the laminate was not sufficiently high in bending rupture elongation.

TABLE 1

| | | molecular weight (Mw) | composition (PBA:PGMA) | unit | Example 1 | Example 2 | Example 3 | Example 4 | Example 5 | Example 6 | Example 7 | Example 8 | Example 9 |
|---|---|---|---|---|---|---|---|---|---|---|---|---|---|
| Epoxy compound | YD-128 | | | parts by mass | 80 | 80 | 80 | 80 | 90 | 80 | 90 | 80 | 90 |
| | jER630 | | | parts by mass | | | | | | | | | |
| Block copolymer | BCP1 | 61,900 | 90:10 | parts by mass | 20 | | | | | | | | |
| | BCP2 | 68,900 | 80:20 | parts by mass | | 20 | | | | | | | |
| | BCP3 | 75,500 | 70:30 | parts by mass | | | 20 | | | | | | |
| | BCP4 | 57,000 | 97:3 | parts by mass | | | | | | | | | |
| | BCP5 | 87,200 | 87:13 | parts by mass | | | | | 20 | 10 | | | |
| | BCP6 | 83,500 | 91:9 | parts by mass | | | | | | | 20 | 10 | |
| | BCP7 | 157,500 | 85:15 | parts by mass | | | | | | | | 20 | 10 |
| | BCP8 | 130,200 | 96:4 | parts by mass | | | | | | | | | |
| | BCP9 | 60,500 | 34:66 | parts by mass | | | | | | | | | |
| | BCP10 | 40,800 | 53:47 | parts by mass | | | | | | | | | |
| | BCP11 | 33,200 | 39:61 | parts by mass | | | | | | | | | |
| Polymer | PBA1 | | | parts by mass | | | | | | | | | |
| Curing agent | 4-methyl-2-ethyl imidazole | | | parts by mass | 3 | 3 | 3 | 3 | 3 | 3 | 3 | 3 | 3 |
| | DICY7 | | | parts by mass | | | | | | | | | |
| | 4,4-DDS | | | parts by mass | | | | | | | | | |
| Additive | DCMU | | | parts by mass | | | | | | | | | |
| Phase structure | X/Y | | | — | 1.02 | 1.05 | 1.02 | 1.03 | 1.03 | 1.06 | 1.07 | 1.04 | 1.05 |
| | existence of microphase-separated structure | | | — | yes | yes | yes | yes | yes | yes | yes | yes | yes |
| | phase-separated structural period | | | nm | 73 | 56 | 52 | 88 | 92 | 117 | 121 | 87 | 93 |
| Mechanical characteristics of resin | bending elastic modulus of cured resin | | | GPa | 2.4 | 2.7 | 2.7 | 1.8 | 2.4 | 2.1 | 2.5 | 2.4 | 2.2 |
| | bending rupture elongation of cured resin | | | mm | 7.9 | 6.7 | 6.7 | 7.2 | 6.6 | 6.3 | 6.0 | 6.2 | 5.2 |
| | toughness of cured resin | | | MPa·m$^{1/2}$ | 0.9 | 0.7 | 0.7 | 0.9 | 0.7 | 0.8 | 0.7 | 0.7 | 0.7 |
| | heat resistance (dynamic viscoelasticity) | | | °C. | | | | | | | | | |

TABLE 2

| | | molecular weight (Mw) | composition (PBA:PGMA) | unit | Example 10 | Example 11 | Example 12 | Example 13 | Example 14 | Example 15 |
|---|---|---|---|---|---|---|---|---|---|---|
| Epoxy compound | YD-128 | | | parts by mass | 80 | 90 | 80 | 90 | 80 | 80 |
| | jER630 | | | parts by mass | | | | | | |
| Block copolymer | BCP1 | 61,900 | 90:10 | parts by mass | 20 | 10 | | | | |
| | BCP2 | 68,900 | 80:20 | parts by mass | | | 20 | 10 | | |
| | BCP3 | 75,500 | 70:30 | parts by mass | | | | | | |
| | BCP4 | 57,000 | 97:3 | parts by mass | | | | | | |
| | BCP5 | 87,200 | 87:13 | parts by mass | | | | | | |
| | BCP6 | 83,500 | 91:9 | parts by mass | | | | | | |
| | BCP7 | 157,500 | 85:15 | parts by mass | | | | | | |
| | BCP8 | 130,200 | 96:4 | parts by mass | | | | | | |
| | BCP9 | 60,500 | 34:66 | parts by mass | | | | | 20 | |
| | BCP10 | 40,800 | 53:47 | parts by mass | | | | | | 20 |
| | BCP11 | 33,200 | 39:61 | parts by mass | | | | | | |
| Polymer | PBA1 | | | parts by mass | | | | | | |
| Curing agent | 4-methyl-2-ethyl imidazole | | | parts by mass | | | | | | |
| | DICY7 | | | parts by mass | 6 | 6 | 6 | 6 | | |
| | 4,4-DDS | | | parts by mass | | | | | 63 | 63 |

TABLE 2-continued

| Additive | DCMU | parts by mass | 2 | 2 | 2 | 2 | | |
|---|---|---|---|---|---|---|---|---|
| Phase structure | X/Y | — | 1.08 | 1.07 | 1.05 | 1.04 | 1.08 | 1.07 |
| | existence of microphase-separated structure | — | yes | yes | yes | yes | yes | yes |
| | phase-separated structural period | nm | 79 | 83 | 68 | 73 | 37 | 37 |
| Mechanical characteristics of resin | bending elastic modulus of cured resin | GPa | 2.9 | 2.9 | 2.8 | 2.9 | 3.0 | 3.2 |
| | bending rupture elongation of cured resin | mm | 11.7 | 9.7 | 9.8 | 9.0 | 6.2 | 6.3 |
| | toughness of cured resin | MPa·m$^{1/2}$ | 1.2 | 1.2 | 1.2 | 1.2 | 0.8 | 0.8 |
| | heat resistance (dynamic viscoelasticity) | °C. | 141.0 | 142.0 | 142.0 | 142.0 | | |

| | | molecular weight (Mw) | composition (PBA:PGMA) | unit | Example 16 | Example 17 | Example 18 | Example 19 |
|---|---|---|---|---|---|---|---|---|
| Epoxy compound | YD-128 | | | parts by mass | 80 | | | |
| | jER630 | | | parts by mass | | 80 | 80 | 80 |
| Block copolymer | BCP1 | 61,900 | 90:10 | parts by mass | | | | |
| | BCP2 | 68,900 | 80:20 | parts by mass | | | | |
| | BCP3 | 75,500 | 70:30 | parts by mass | | | | |
| | BCP4 | 57,000 | 97:3 | parts by mass | | | | |
| | BCP5 | 87,200 | 87:13 | parts by mass | | | | |
| | BCP6 | 83,500 | 91:9 | parts by mass | | | | |
| | BCP7 | 157,500 | 85:15 | parts by mass | | | | |
| | BCP8 | 130,200 | 96:4 | parts by mass | | | | |
| | BCP9 | 60,500 | 34:66 | parts by mass | | 20 | | |
| | BCP10 | 40,800 | 53:47 | parts by mass | | | 20 | |
| | BCP11 | 33,200 | 39:61 | parts by mass | 20 | | | 20 |
| Polymer | PBA1 | | | parts by mass | | | | |
| Curing agent | 4-methyl-2-ethyl imidazole | | | parts by mass | | | | |
| | DICY7 | | | parts by mass | | | | |
| | 4,4-DDS | | | parts by mass | 63 | 63 | 63 | 63 |
| Additive | DCMU | | | parts by mass | | | | |
| Phase structure | X/Y | | | — | 1.08 | 1.08 | 1.09 | 1.08 |
| | existence of microphase-separated structure | | | — | yes | yes | yes | yes |
| | phase-separated structural period | | | nm | 32 | 34 | 34 | 26 |
| Mechanical characteristics of resin | bending elastic modulus of cured resin | | | GPa | 3.0 | 3.9 | 3.5 | 3.8 |
| | bending rupture elongation of cured resin | | | mm | 6.9 | 6.4 | 6.8 | 6.9 |
| | toughness of cured resin | | | MPa·m$^{1/2}$ | 0.9 | 0.8 | 0.8 | 0.9 |
| | heat resistance (dynamic viscoelasticity) | | | °C. | | | | |

TABLE 3

| | | molecular weight (Mw) | composition (PBA:PGMA) | unit | Comparative example 1 | Comparative example 2 | Comparative example 3 | Comparative example 4 | Comparative example 5 | Comparative example 6 |
|---|---|---|---|---|---|---|---|---|---|---|
| Epoxy compound | YD-128 | | | parts by mass | 100 | 80 | 97 | 95 | 95 | 95 |
| | JER630 | | | parts by mass | | | | | | |
| Block copolymer | BCP1 | 61,900 | 90:10 | parts by mass | | | 3 | 5 | | |
| | BCP2 | 68,900 | 80:20 | parts by mass | | | | | 5 | |
| | BCP3 | 75,500 | 70:30 | parts by mass | | | | | | 5 |
| | BCP4 | 57,000 | 97:3 | parts by mass | | | | | | |
| | BCP5 | 87,200 | 87:13 | parts by mass | | | | | | |
| | BCP6 | 83,500 | 91:9 | parts by mass | | | | | | |
| | BCP7 | 157,500 | 85:15 | parts by mass | | | | | | |
| | BCP8 | 130,200 | 96:4 | parts by mass | | | | | | |
| | BCP9 | 60,500 | 34:66 | parts by mass | | | | | | |
| | BCP10 | 40800 | 53:47 | parts by mass | | | | | | |
| | BCP11 | 33,200 | 39:61 | parts by mass | | | | | | |
| Polymer | PBA1 | | | parts by mass | | 20 | | | | |
| Curing agent | 4-methyl-2-ethyl imidazole | | | parts by mass | 3 | 3 | 3 | 3 | 3 | 3 |
| | DICY7 | | | parts by mass | | | | | | |
| | 4,4-DDS | | | parts by mass | | | | | | |
| Additive | DCMU | | | parts by mass | | | | | | |
| Phase structure | X/Y | | | — | — | — | 1.4 | 1.3 | 1.25 | 1.28 |
| | existence of microphase-separated structure | | | — | none | coarse phase separation | none | none | none | none |
| | phase-separated structural period | | | nm | — | coarse phase separation | 120 | 95 | 93 | 88 |

TABLE 3-continued

| Mechanical characteristics of resin | bending elastic modulus of cured resin | | GPa | 2.8 | 1.0 | 2.6 | 2.6 | 2.6 | 2.6 |
|---|---|---|---|---|---|---|---|---|---|
| | bending rupture elongation of cured resin | | mm | 5.9 | 1.5 | 6.0 | 5.9 | 5.9 | 5.7 |
| | toughness of cured resin | | MPa · m$^{1/2}$ | 0.6 | unmeasurable | 0.6 | 0.6 | 0.6 | 0.6 |
| | heat resistance (dynamic viscoelasticity) | | °C. | | | | | | |

|  |  | molecular weight (Mw) | composition (PBA:PGMA) | unit | Comparative example 7 | Comparative example 8 | Comparative example 9 | Comparative example 10 |
|---|---|---|---|---|---|---|---|---|
| Epoxy compound | YD-128 | | | parts by mass | 80 | 80 | 100 | 80 |
| | JER630 | | | parts by mass | | | | |
| Block copolymer | BCP1 | 61,900 | 90:10 | parts by mass | | | | |
| | BCP2 | 68,900 | 80:20 | parts by mass | | | | |
| | BCP3 | 75,500 | 70:30 | parts by mass | | | | |
| | BCP4 | 57,000 | 97:3 | parts by mass | 20 | | | 20 |
| | BCP5 | 87,200 | 87:13 | parts by mass | | | | |
| | BCP6 | 83,500 | 91:9 | parts by mass | | | | |
| | BCP7 | 157,500 | 85:15 | parts by mass | | | | |
| | BCP8 | 130,200 | 96:4 | parts by mass | | 20 | | |
| | BCP9 | 60,500 | 34:66 | parts by mass | | | | |
| | BCP10 | 40800 | 53:47 | parts by mass | | | | |
| | BCP11 | 33,200 | 39:61 | parts by mass | | | | |
| Polymer | PBA1 | | | parts by mass | | | | |
| Curing agent | 4-methyl-2-ethyl imidazole | | | parts by mass | 3 | 3 | | |
| | DICY7 | | | parts by mass | | | 6 | 6 |
| | 4,4-DDS | | | parts by mass | | | | |
| Additive | DCMU | | | parts by mass | | | 2 | 2 |
| Phase structure | X/Y | | | — | — | — | — | — |
| | existence of microphase-separated structure | | | — | coarse phase separation | coarse phase separation | none | coarse phase separation |
| | phase-separated structural period | | | nm | coarse phase separation | coarse phase separation | — | coarse phase separation |
| Mechanical characteristics of resin | bending elastic modulus of cured resin | | | GPa | 0.8 | 0.3 | 2.9 | 0.7 |
| | bending rupture elongation of cured resin | | | mm | 2.9 | 3.2 | 8.5 | 3.0 |
| | toughness of cured resin | | | MPa · m$^{1/2}$ | unmeasurable | unmmeasurable | 1.0 | unmeasurable |
| | heat resistance (dynamic viscoelasticity) | | | °C. | | | 142.0 | 109.0 |

TABLE 4

|  |  | molecular weight (Mw) | composition (PBA:PGMA) | unit | Comparative example 11 | Comparative example 12 | Comparative example 13 | Comparative example 14 | Comparative example 15 | Comparative example 16 |
|---|---|---|---|---|---|---|---|---|---|---|
| Epoxy compound | YD-128 | | | parts by mass | 95 | 95 | 95 | 100 | | 80 |
| | jER630 | | | parts by mass | | | | | 100 | |
| Block copolymer | BCP1 | 61,900 | 90:10 | parts by mass | 5 | | | | | |
| | BCP2 | 68,900 | 80.20 | parts by mass | | 5 | | | | |
| | BCP3 | 75,500 | 70:30 | parts by mass | | | 5 | | | 20 |
| | BCP4 | 57,000 | 97:3 | parts by mass | | | | | | |
| | BCP5 | 87,200 | 87:13 | parts by mass | | | | | | |
| | BCP6 | 83,500 | 91:9 | parts by mass | | | | | | |
| | BCP7 | 157,500 | 85:15 | parts by mass | | | | | | |
| | BCP8 | 130,200 | 96:4 | parts by mass | | | | | | |
| | BCP9 | 60,500 | 34:66 | parts by mass | | | | | | |
| | BCP10 | 40,800 | 53:47 | parts by mass | | | | | | |
| | BCP11 | 33,200 | 39:61 | parts by mass | | | | | | |
| Polymer | PBA1 | | | parts by mass | | | | | | |
| Curing agent | 4-methyl-2-ethyl imidazole | | | parts by mass | | | | | | |
| | DICY7 | | | parts by mass | 6 | 6 | 6 | | | |
| | 4,4-DDS | | | parts by mass | | | | 63 | 63 | 63 |
| Additive | DCMU | | | parts by mass | 2 | 2 | 2 | | | |
| Phase structure | X/Y | | | — | 1.5 | 1.6 | 1.6 | — | — | — |
| | existence of microphase-separated structure | | | — | none | none | none | none | none | coarse phase separation |
| | phase-separated structural period | | | nm | 90 | 95 | 102 | — | — | coarse phase separation |

TABLE 4-continued

| Mechanical characteristics of resin | bending elastic modulus of cured resin | GPa | 2.9 | 2.9 | 2.9 | 3.5 | 4.2 | 0.8 |
|---|---|---|---|---|---|---|---|---|
| | bending rupture elongation of cured resin | mm | 8.2 | 8.2 | 8.1 | 5.8 | 6.3 | 3.6 |
| | toughness of cured resin | MPa·m$^{1/2}$ | 1.0 | 1.1 | 1.0 | 0.7 | 0.7 | unmeasurable |
| | heat resistance (dynamic viscoelasticity) | °C. | 140.0 | 141.0 | 142.0 | | | |

| | | molecular weight (Mw) | composition (PBA:PGMA) | unit | Comparative example 17 | Comparative example 18 | Comparative example 19 | Comparative example 20 |
|---|---|---|---|---|---|---|---|---|
| Epoxy compound | YD-128 | | | parts by mass | | 95 | 95 | 95 |
| | jER630 | | | parts by mass | 80 | | | |
| Block copolymer | BCP1 | 61,900 | 90:10 | parts by mass | | 5 | | |
| | BCP2 | 68,900 | 80:20 | parts by mass | | | 5 | |
| | BCP3 | 75,500 | 70:30 | parts by mass | 20 | | | 5 |
| | BCP4 | 57,000 | 97:3 | parts by mass | | | | |
| | BCP5 | 87,200 | 87:13 | parts by mass | | | | |
| | BCP6 | 83,500 | 91:9 | parts by mass | | | | |
| | BCP7 | 157,500 | 85:15 | parts by mass | | | | |
| | BCP8 | 130,200 | 96:4 | parts by mass | | | | |
| | BCP9 | 60,500 | 34:66 | parts by mass | | | | |
| | BCP10 | 40,800 | 53:47 | parts by mass | | | | |
| | BCP11 | 33,200 | 39:61 | parts by mass | | | | |
| Polymer | PBA1 | | | parts by mass | | | | |
| Curing agent | 4-methyl-2-ethyl imidazole | | | parts by mass | | | | |
| | DICY7 | | | parts by mass | | | | |
| | 4,4-DDS | | | parts by mass | 63 | 63 | 63 | 63 |
| Additive | DCMU | | | parts by mass | | | | |
| Phase structure | X/Y | | | — | — | 1.7 | 1.7 | 1.7 |
| | existence of microphase-separated structure | | | — | coarse phase separation | none | none | none |
| | phase-separated structural period | | | nm | coarse phase separation | 120 | 105 | 103 |
| Mechanical characteristics of resin | bending elastic modulus of cured resin | | | GPa | 1.0 | 3.2 | 3.3 | 3.4 |
| | bending rupture elongation of cured resin | | | mm | 2.5 | 4.1 | 3.9 | 3.9 |
| | toughness of cured resin | | | MPa·m$^{1/2}$ | unmeasurable | 0.7 | 0.6 | 0.6 |
| | heat resistance (dynamic viscoelasticity) | | | °C. | | | | |

TABLE 5

| | | molecular weight (Mw) | composition (PBA:PGMA) | unit | Example 20 | Example 21 | Example 22 | Example 23 | Comparative example 21 | Comparative example 22 | Comparative example 23 |
|---|---|---|---|---|---|---|---|---|---|---|---|
| Epoxy compound | YD-128 | | | parts by mass | 48 | 48 | 54 | 54 | 60 | 48 | 57 |
| | jER630 | | | parts by mass | 32 | 32 | 36 | 36 | 40 | 32 | 38 |
| Block copolymer | BCP1 | 61,900 | 90:10 | parts by mass | 20 | | | | | | 5 |
| | BCP2 | 68,900 | 80:20 | parts by mass | | 20 | | | | | |
| | BCP3 | 75,500 | 70:30 | parts by mass | | | | | | | |
| | BCP4 | 57,000 | 97:3 | parts by mass | | | | | | 20 | |
| | BCP5 | 87,200 | 87:13 | parts by mass | | | | | | | |
| | BCP6 | 83,500 | 91:9 | parts by mass | | | 10 | | | | |
| | BCP7 | 157,500 | 85:15 | parts by mass | | | | | | | |
| | BCP8 | 130,200 | 96:4 | parts by mass | | | | | | | |
| | BCP9 | 60,500 | 34:66 | parts by mass | | | | 10 | | | |
| | BCP10 | 40,800 | 53:47 | parts by mass | | | | | | | |
| | BCP11 | 33,200 | 39:61 | parts by mass | | | | | | | |
| Polymer | PBA1 | | | parts by mass | | | | | | | |
| Curing agent | 4-methyl-2-ethyl imidazole | | | parts by mass | | | | | | | |
| | DICY7 | | | parts by mass | 6 | 6 | 6 | 6 | 6 | 6 | 6 |
| | 4,4-DDS | | | parts by mass | | | | | | | |
| Additive | DCMU | | | parts by mass | 2 | 2 | 2 | 2 | 2 | 2 | 2 |
| Phase structure | X/Y | | | — | 1.08 | 1.09 | 1.07 | 1.07 | — | — | 1.50 |
| | existence of microphase-separated structure | | | — | yes | yes | yes | yes | none | coarse phase separation | none |

TABLE 5-continued

| | molecular weight (Mw) | composition (PBA:PGMA) | unit | Example 20 | Example 21 | Example 22 | Example 23 | Comparative example 21 | Comparative example 22 | Comparative example 23 |
|---|---|---|---|---|---|---|---|---|---|---|
| | phase-separated structural period | | nm | 79 | 83 | 110 | 68 | — | coarse phase separation | 85 |
| Mechanical characteristics of resin | bending elastic modulus of cured resin | | GPa | 3.6 | 3.4 | 3.6 | 3.6 | 3.6 | 2.8 | 3.1 |
| | bending rupture elongation of cured resin | | mm | 10.2 | 9.9 | 8.9 | 8.6 | 7.5 | 3.4 | 6.8 |
| | toughness of cured resin | | MPa·m$^{1/2}$ | 1.4 | 1.3 | 1.1 | 1.3 | 1.0 | unmeasurable | 1.1 |
| Mechanical characteristics of CFRP | 0° bending strength | | MPa | 1,162 | 1,149 | 1,173 | 1,159 | 1,136 | 1,002 | 1,128 |
| | 0° bending rupture elongation | | mm | 6.7 | 6.9 | 6.3 | 6.1 | 5.1 | 2.1 | 5.7 |
| | 90° bending strength | | MPa | 161 | 162 | 166 | 159 | 157 | 113 | 151 |
| | 90° bending rupture elongation | | mm | 1.8 | 1.7 | 1.7 | 1.6 | 1.4 | 1 | 1.5 |

INDUSTRIAL APPLICABILITY

Fiber reinforced composite materials containing a cured product of the epoxy resin composition according to the present invention as matrix resin are used favorably for producing sports goods, general industrial products, and aerospace components. More specifically, applications in the sporting goods industry include golf shaft, fishing pole, rackets for tennis, badminton, etc., hockey stick, and skiing pole. The aforementioned general industrial applications include structural members of vehicles such as automobile, bicycle, ship, and railroad vehicle as well as drive shaft, plate spring, windmill blade, pressure vessel, flywheel, roller for paper manufacture, roofing material, cable, and mending/reinforcing materials.

The invention claimed is:

1. A curable epoxy resin composition capable of forming a cured resin having a microphase-separated structure, comprising:
   an epoxy compound (A),
   a block copolymer (B) that accounts for 10 mass % or more and 50 mass % or less of the epoxy resin composition and has a molecular weight distribution of 1.50 or less, and
   a curing agent (C) provided in an amount sufficient to allow the curing reaction to proceed and result in a cured resin having a microphase-separated structure, wherein
   the block copolymer (B) is composed of a polymer block (a) containing a (meth)acrylic polymer and another polymer block (b) containing an acrylic polymer different from that of the polymer block (a),
   polymer block (a) accounts for 5 mass % or more and 80 mass % or less of the block copolymer (B),
   glycidyl (meth)acrylate accounts for 50 mass % or more of the polymer block (a) in the block copolymer (B), and
   monomers having a glycidyl group account for less than 50 mass % in polymer block (b).

2. The epoxy resin composition according to claim 1, wherein upon being cured the epoxy resin composition has a microphase-separated structure and satisfies the relationship $0 < X/Y \leq 1.10$ wherein X represents the half-width of the primary scattering peak in small-angle X-ray scattering observation of the cured resin and Y represents the maximum wave number of the peak.

3. The epoxy resin composition according to claim 1, wherein the microphase-separated structure in the cured resin is one selected from the group consisting of lamella structure, gyroid structure, cylinder structure, and sphere structure.

4. The epoxy resin composition according to claim 1, wherein the block copolymer (B) is an ABA type triblock copolymer wherein A represents the polymer block (a) and B represents the polymer block (b).

5. The epoxy resin composition according to claim 1, wherein the block copolymer (B) has a weight average molecular weight of 10,000 or more and 400,000 or less.

6. The epoxy resin composition according to claim 1, wherein n-butyl acrylate accounts for 50 mass % or more of the polymer block (b) in the block copolymer (B).

7. The epoxy resin composition according to claim 1, wherein the curing agent (C) is a polyamine based curing agent and the polymer block (a) accounts for 40 mass % or more and 70 mass % or less of the block copolymer (B).

8. The epoxy resin composition according to claim 1, wherein the curing agent (C) is a dicyandiamide based curing agent and the polymer block (a) accounts for 5 mass % or more and 40 mass % or less of the block copolymer (B).

9. The epoxy resin composition according to claim 1, wherein the curing agent (C) is an anionic or cationic polymerization based curing agent and the polymer block (a) accounts for 5 mass % or more and 30 mass % or less of the block copolymer (B).

10. Prepreg comprising an epoxy resin composition as described in claim 1 and reinforcing fiber.

11. Fiber reinforced composite material produced by curing prepreg as described in claim 10.

12. Fiber reinforced composite material comprising cured resin produced by curing an epoxy resin composition as described in claim 1 and reinforcing fiber.

* * * * *